(12) United States Patent
Bradley et al.

(10) Patent No.: US 9,069,144 B2
(45) Date of Patent: Jun. 30, 2015

(54) CONNECTORS FOR USE WITH POLARIZATION-MAINTAINING AND MULTICORE OPTICAL FIBER CABLES

(75) Inventors: Kelvin B. Bradley, Lawrenceville, GA (US); Jinkee Kim, Norcross, GA (US); Gregory A. Sandels, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 219 days.

(21) Appl. No.: 13/468,508

(22) Filed: May 10, 2012

(65) Prior Publication Data

US 2012/0219255 A1 Aug. 30, 2012

Related U.S. Application Data

(63) Continuation-in-part of application No. 13/049,794, filed on Mar. 16, 2011.

(60) Provisional application No. 61/314,165, filed on Mar. 16, 2010.

(51) Int. Cl.
*G02B 6/36* (2006.01)
*G02B 6/38* (2006.01)

(52) U.S. Cl.
CPC ........... *G02B 6/3885* (2013.01); *Y10T 29/4978* (2015.01); *G02B 6/3851* (2013.01); *G02B 6/3893* (2013.01)

(58) Field of Classification Search
None
See application file for complete search history.

(56) References Cited

U.S. PATENT DOCUMENTS

| | | | | |
|---|---|---|---|---|
| 4,762,387 | A * | 8/1988 | Batdorf et al. | 385/71 |
| 6,580,860 | B1 * | 6/2003 | Varner | 385/123 |
| 2003/0053758 | A1 * | 3/2003 | Monte | 385/52 |
| 2003/0198442 | A1 * | 10/2003 | Cheng et al. | 385/83 |
| 2011/0229086 | A1 * | 9/2011 | Bradley et al. | 385/78 |

FOREIGN PATENT DOCUMENTS

JP 09203815 A * 8/1997

* cited by examiner

*Primary Examiner* — Tina Wong
(74) *Attorney, Agent, or Firm* — Jacobs & Kim, LLP

(57) ABSTRACT

An optical fiber ferrule has a plurality of guide holes therein for guiding a respective plurality of flat-sided fibers at an end of a multifiber optical fiber cable. The fibers' flat sides identify a particular rotational orientation of the fiber. Rotational alignment is achieved by urging the fibers' flat sides against a corresponding reference surface within the ferrule or within an alignment fixture. Also described is a fiber array block having a plurality of V-shaped grooves extending across an outer surface and terminating at an endface. The V-shaped grooves are shaped to guide a respective plurality of flat-sided fibers. A lid is installable across the plurality of V-shaped grooves, over fibers that have been loaded therein.

7 Claims, 25 Drawing Sheets

CONNECTORS FOR USE WITH POLARIZATION-MAINTAINING AND MULTICORE OPTICAL FIBER CABLES

CROSS REFERENCE TO RELATED APPLICATIONS

The present application is a continuation-in-part of co-pending U.S. patent application Ser. No. 13/049,794, filed on Mar. 16, 2011.

U.S. patent application Ser. No. 13/049,794 claims the priority benefit of U.S. Provisional Patent Application Ser. No. 61/314,165, filed on Mar. 16, 2010.

The above applications are owned by the assignee of the present application, and are incorporated herein by reference in their entirety.

BACKGROUND OF THE INVENTION

1. Field of the Invention

The present invention relates generally to the field of fiber optics, and in particular to improved connectors for polarization-maintaining and multicore optical fiber cables.

2. Background Art

Optical fiber connectors are used to join optical fibers where a connect/disconnect capability is required. The design of optical fiber connectors has been challenging for a number of reasons, including the small diameter of a typical optical fiber, and the need for a secure, low-loss connection between fibers. A further challenge has been presented by multi-fiber optical cables, which have required the development of connectors that can accommodate a plurality of closely-spaced individual fibers.

One issue that has not been satisfactorily addressed by the prior art is the alignment issue presented by fibers requiring rotational alignment. Such fibers, include, for example, multicore fibers and polarization-maintaining fibers. One particularly challenging problem to be addressed is how to provide rotationally aligned connectorization for optical cables containing closely spaced arrays of these types of fibers.

SUMMARY OF THE INVENTION

A first aspect of the invention provides a polarization-maintaining fiber having fast and slow first and second principal transmission axes. The fiber has a flat side surface indicating the rotational orientation of a transmission axis, such that the fiber transmission axis is alignable to a selected rotational orientation by causing the flat side surface to abut a reference surface.

A further aspect of the invention is directed to a ferrule having a plurality of guide holes therein for guiding a respective plurality of polarization-maintaining fibers at an end of a multifiber optical fiber cable. The polarization-maintaining fibers each have at least one flat side surface identifying a particular rotational orientation of a transmission axis, such that the fiber transmission axis is alignable to a selected rotational orientation by causing the flat side surface to abut a reference surface.

Another aspect of the invention is directed to an alignment fixture. A chassis is shaped to receive a multifiber ferrule having a plurality of guide holes from which there extends a respective plurality of polarization-maintaining fibers each having a flat side surface indicating rotational orientation. The fixture further includes fiber alignment means for urging the flat side surfaces of the polarization-maintaining fibers against a reference surface, so as to cause each of the polarization-maintaining fibers to be rotationally aligned within its respective guide hole.

Another aspect of the invention provides a fiber array block having a plurality of V-shaped grooves extending across an outer surface and terminating at an endface. The plurality of V-shaped grooves are shaped to guide a respective plurality of fibers having one or more flat sides indicative of its rotational orientation. A lid is installable across the plurality of V-shaped grooves, thereby holding in place fibers that have been loaded into the plurality of V-shaped grooves. The substrate, lid, and fibers are configured such that installation of the lid over fibers that have been loaded into the plurality of V-shaped grooves results in alignment of the loaded fibers according to a desired rotational orientation.

Further aspects of the invention are directed to methods for provide rotationally aligned connectorization for flat-sided fibers, including polarization-maintaining fibers and multicore fibers.

DETAILED DESCRIPTION

Aspects of the invention are directed to connectors for use with polarization-maintaining and multicore fiber cables. As used herein, the term "polarization-maintaining fiber" (PMF) refers generally to an optical fiber that is designed to have a high birefringence, whereby light travels at significantly different speeds along first and second transmission axes. As used herein, the term "multicore fiber" (MCF) refers generally to an optical fiber having a plurality of individual cores that extend longitudinally through a common cladding, thereby providing a corresponding plurality of parallel data transmission channels. Various exemplary PMFs and MCFs are depicted herein, having different cross-sectional profiles. It will be appreciated that the structures and techniques described herein may be implemented using PMFs or MCFs having configurations different from those specifically depicted herein.

The present specification is divided into two sections. Section A describes connector structures and techniques for use with MCFs. Section A has been taken from U.S. patent application Ser. No. 13/049,794, from which the present application claims priority.

Section B describes connector structures and techniques for use with flat-sided PMFs and MCFs. (As discussed in Section B, a "flat-sided MCF" is an MCF having one or more flat surfaces at its outer perimeter, wherein the one or more flat surfaces provides a precise indication of the rotational orientation of the plurality of cores extending through the fiber.)

Section A

Section A of the invention is organized into the following sections:
1. Multicore Multifiber Connectors Using Circular Fibers
2. Multicore Multifiber Connectors Using D-Shaped Fibers
3. Alignment Techniques for D-Shaped Multicore Fibers
   3.1 Ramp Method
   3.2 Tapered Slot Method
   3.3 Slot Method
   3.4 Wedge Method
4. Multifiber Ferrules with D-Shaped Holes and D-Shaped Fibers
5. Multicore Multifiber Connectors Using Polygonal Fibers
6. Multicore Multifiber Connectors Using Other Fiber Shapes
7. General Techniques
8. Conclusion 1. Multicore Multifiber Connectors Using Circular Fibers To address the shortcomings of the current approach, multicore fibers (MCF), which can be butt-coupled with specially designed 2-dimensional VCSEL and PiN photo detector arrays to facilitate simultaneous transmission over several cores, within each fiber, are utilized.

Figure 1A:
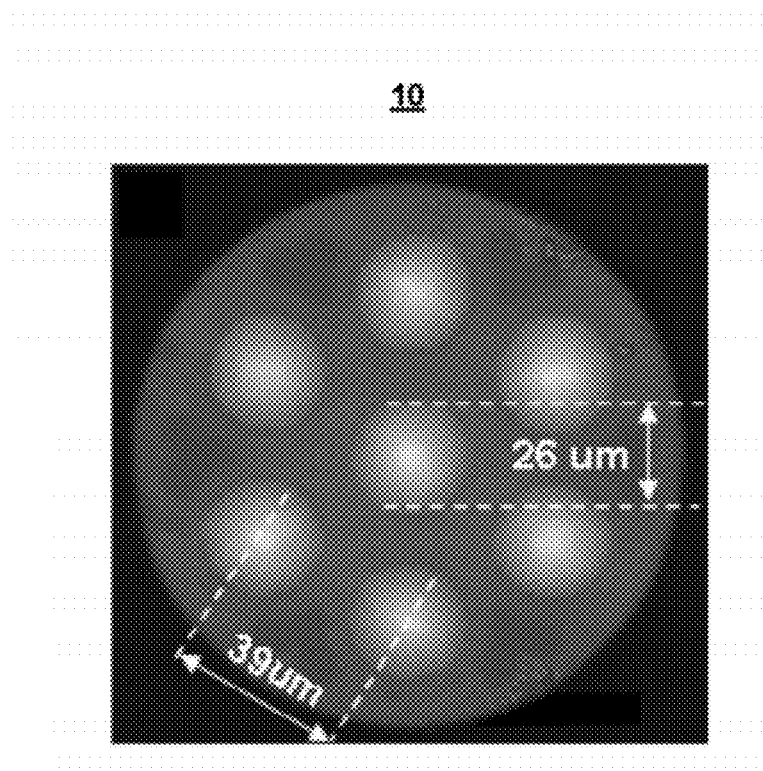
FIGS. 1A and 1B show, respectively, a cross section photograph and diagram of an exemplary MCF.
Figure 1B:
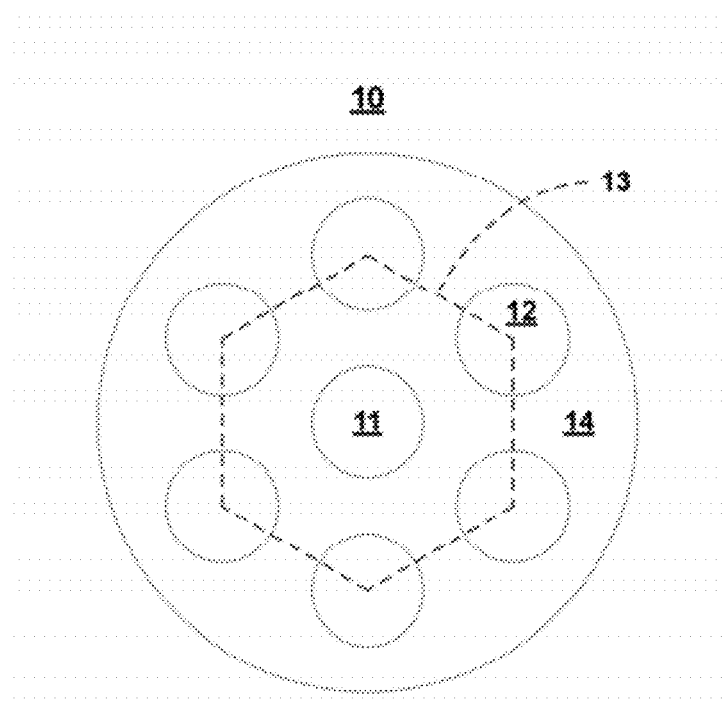

FIGS. 1A and 1B show, respectively, a cross section photograph and diagram of an exemplary MCF 10, which is described in greater detail in U.S. patent application Ser. No. 13/045,065, which is owned by the assignee of the present application, and which is incorporated herein in its entirety.

MCF 10 comprises seven graded-index cores, produced from seven graded-index LaserWave fiber core rods using a stack-and-draw process. The cores are arranged in a hexagonal array including a center core 11 and six outer cores 12 positioned at the vertices of a regular hexagon 13 in a cladding 14. The diameter of each of the cores is 26 μm, and the core pitch is 39 μm. The cladding diameter is 125 μm and the acrylate dual coating layer (not shown) is 250 μm. These diameters are compatible with conventional optical connectivity products, but other cladding diameters and geometrical configurations are also feasible. It should also be noted that aspects of the invention described herein may also be practiced with multicore fibers having different types of cores, such as step-index or single-mode cores.

Figures 2A, 2B:
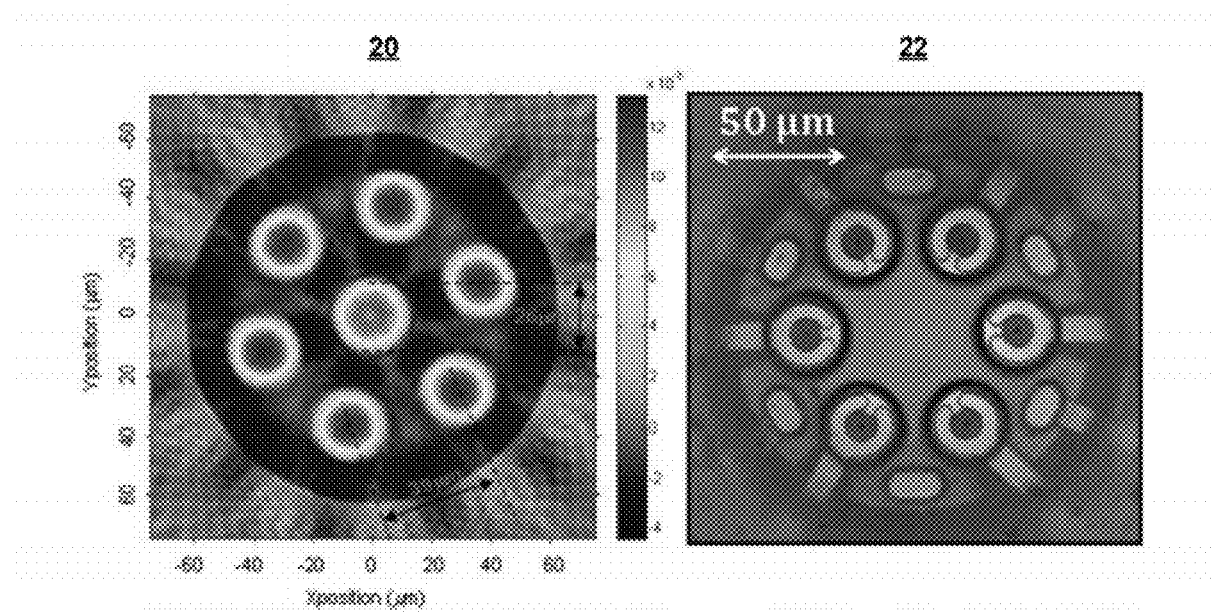
FIG. 2A shows a tomographic refractive index profile of the 7-core MCF shown in FIGS. 1A and 1B.
FIG. 2B shows an image of a hexagonally arranged VCSEL array that can be used to interface with the outer six cores of the MCF shown in FIGS. 1A and 1B.
Figure 2C:
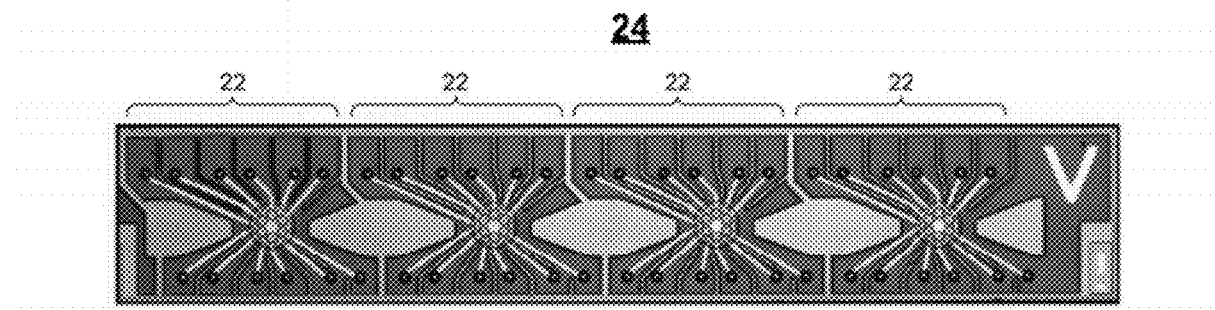
FIG. 2C shows an image of a transmitter subassembly, comprising four side-by-side VCSEL arrays of the type shown in FIG. 2B.

FIG. 2A shows a tomographic refractive index profile 20 of MCF 10. FIG. 2B shows an image of a hexagonally arranged VCSEL array 22 that can be use to interface with the outer six cores of MCF 10. FIG. 2C shows an example of four VCSEL arrays 22, each array comprising six VCSELs. Such a device could be used to transmit through the six outer cores of a 7-core multicore fiber. Of course, other core counts and VCSEL configurations are possible (e.g., 2×2, etc.).

Aspects of the present invention are described with respect to an exemplary multifiber ribbon cable comprising a plurality of individual MCFs arranged side-to-side in a single linear array. However, it will be appreciated that, with suitable modification as required, the described structures and techniques may also be practiced with other configurations.

As mentioned above, MCF 10 has an outer diameter that is compatible with already existing single-core fiber connectivity products. Thus, a multi-MCF cable will be compatible with ferrules and other connectors developed for single-core multifiber cables. However, as discussed below, beyond the issue of fit, there is an issue with respect to achieving a proper rotational alignment of each individual MCF within a given connectivity device.

Figure 3:
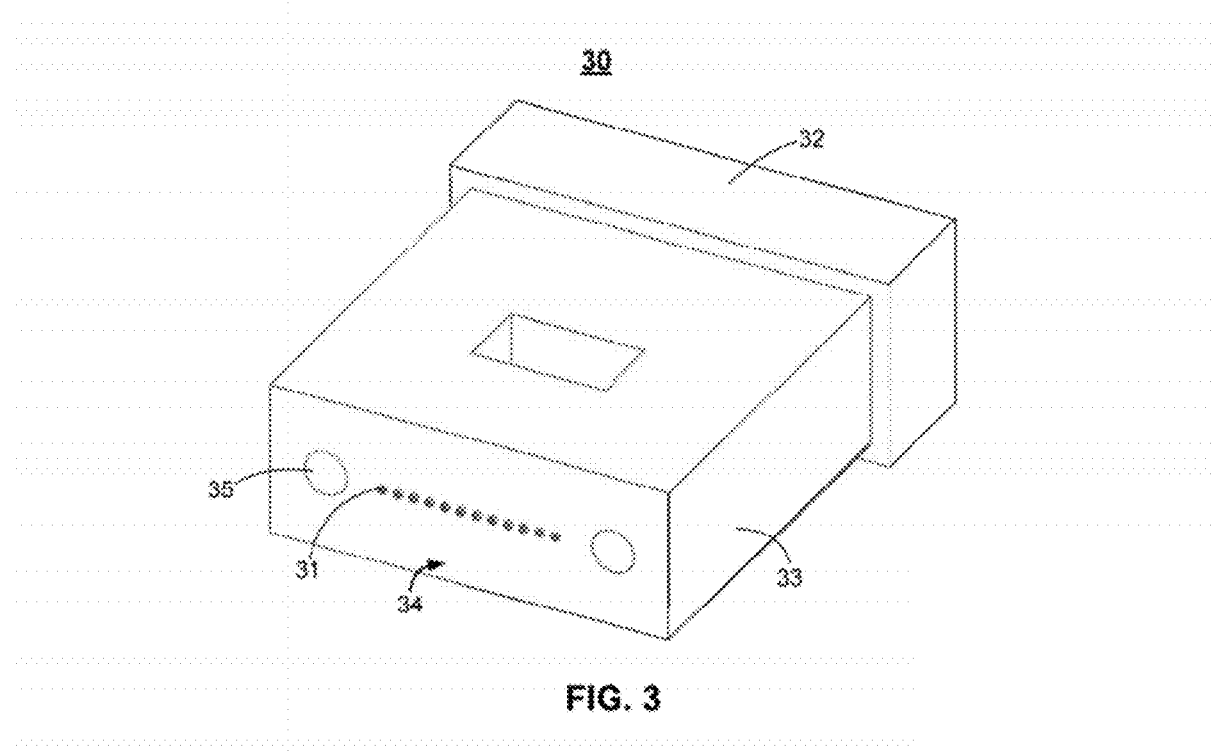
FIG. 3 shows a perspective view of an exemplary 12-fiber MT ferrule, into which there are terminated twelve 7-core MCFs.

FIG. 3 shows a perspective view of an exemplary 12-fiber MT ferrule 30, into which there are terminated twelve 7-core MCFs 31.

Figure 4:
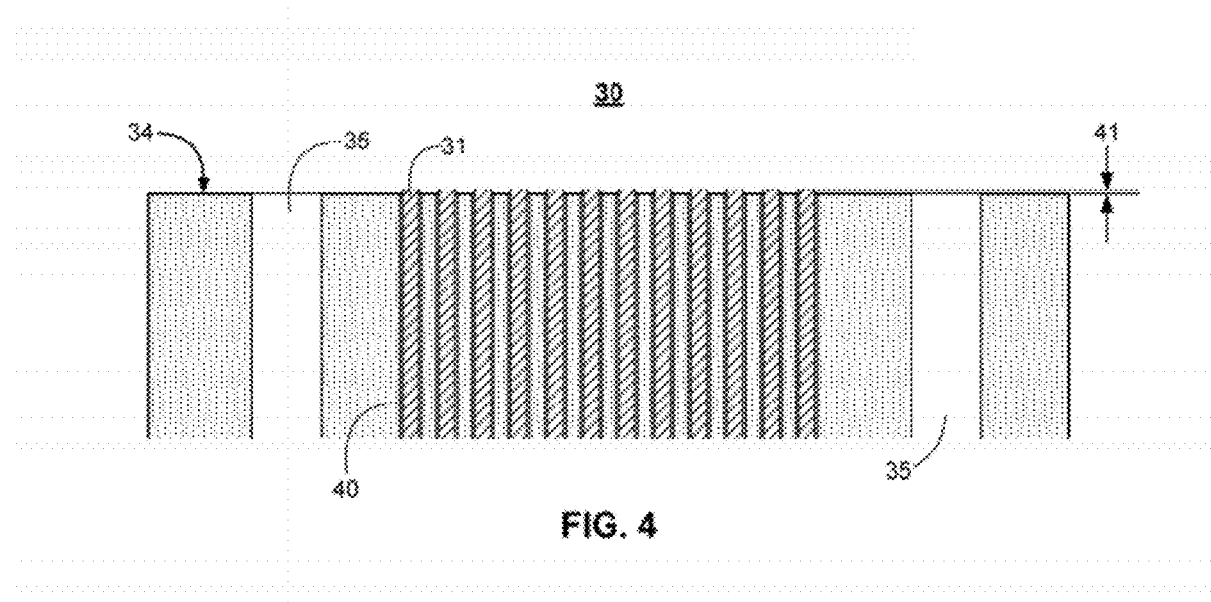
FIG. 4 shows a cross section of the front section of ferrule shown in FIG. 3, through a plane passing through the longitudinal axes of the MCFs.

FIG. 4 shows a cross section of the front section of ferrule 30, through a plane passing through the longitudinal axes of MCFs 31.

Ferrule 30 comprises a molded plastic body including two block-shaped sections: base 32 and head 33. A plurality of guide holes 40, arranged side-to-side in a linear array, extends through the ferrule head 33 terminating at ferrule endface 34. Guide holes 40 are shaped and dimensioned to closely receive fibers 31. At the end of the ferrule mounting process, each fiber is firmly held in position within its respective guide hole by epoxy, or other suitable material.

Prior to the fibers being bonded to the ferrule with epoxy, each fiber is rotated longitudinally with respect to the ferrule such that the cores of each fiber are aligned in a pre-determined orientation. For instance, each fiber could be oriented so one of its cores is in the 12 o'clock position. The orientation could be performed manually or via an automated process.

Ferrule 30 further comprises a pair of alignment holes 35. As discussed below, alignment holes 35 are configured to receiving respective alignment pins in order to help align ferrule 30 as it is seated into a mating structure.

It will be seen that by combining ferrule 30, containing appropriately aligned MCFs 31, with a suitably configured 2-dimensional VCSEL array, of the type shown in FIG. 2C (array 24), it is possible to realize parallel transmission down 72 channels in the same space required for 12-channel transmission with conventional single-core fibers.

Since MT ferrules are available with fewer holes, terminated variants with fewer fibers could also be produced. Also, multicore fibers could be utilized in other multifiber connector configurations like MT-RJ and MPX connectors, as previously mentioned. MT-RJ connectors typically contain 2 to 4 fibers and MPX Connectors could be produced with 4, 8, or 12 multicore fibers. In addition, multicore fibers with any number of cores, and MT ferrules with any number of holes could be produced. Thus, multifiber connectors with various channel counts are possible.

For reliable connections between fibers, all of the fiber cores must be in contact, under pressure, when two multifiber connectors are mated. This is particularly important for multicore fibers, since the cores can be located some distance from the axis of the fiber. When connectors are polished, the endfaces of the fibers are convex. Thus, fiber-to-fiber contact pressure is required to deform (i.e., flatten) the convex endfaces enough to allow the outer cores to fully meet. Fiber-to-fiber contact between multifiber connectors is achieved by polishing the multifiber ferrules so the fibers protrude several micrometers, above the surface of the ferrule.

FIG. 4, discussed above, illustrates the protrusion 41 of the MCFs 31 from the ferrule endface 34. As mentioned above, the MCFs have an outer cladding diameter of approximately 125 µm. After assembly, each MCF will typically protrude from the ferrule endface 34 a distance ranging from 1 µm to 15 µm.

2. Multicore Multifiber Connectors Using D-Shaped Fibers

Figures 5, 6:
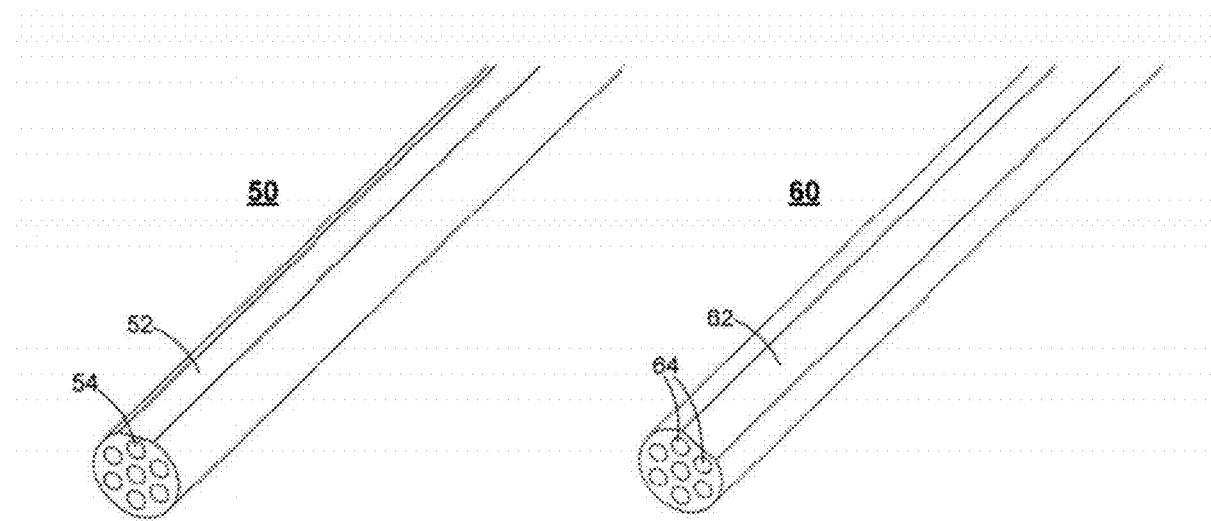
FIGS. 5 and 6 show perspective views of exemplary D-shaped 7-core multicore fibers according to aspects of the invention.

FIGS. 5 and 6 show perspective views of exemplary D-shaped 7-core multicore fibers 50, 60 according to aspects of the invention. Each multicore fiber 50, 60 is provided with a flat side flat surface 52, 62 extending along the length of the fiber. It should be noted that although fibers 50 and 60 are each depicted with a single flat side surface, aspects of the present invention may also be practiced with a fiber comprises a plurality of flat side surfaces.

In each multicore fiber 50, 60, the flat 52, 62 is strategically located to facilitate core orientation relative to the keying features of an optical connector. In FIG. 5, the flat is adjacent to one of the MCF cores 54, so the position of that core, as well as that of the remaining cores can be oriented and fixed relative to the keying features of a multifiber connector. As shown in FIG. 6, the flat could be positioned adjacent to any two side-by-side cores 64, which would also allow the position of those two cores, as well as that of the remaining cores, to be oriented and fixed relative to the keying features of a connector.

3. Alignment Techniques for D-Shaped Multicore

A significant issue to be resolved in mounting a ferrule onto an end of a multi-MCF cable is rotational alignment of the individual MCFs within the ferrule. It will be appreciate that when a multi-MCF cable end is stripped, and when the individual MCFs are loaded into a ferrule, there will typically be some amount of rotational misalignment of the MCF cores. Thus, even if the individual MCFs are precisely aligned within the jacketed cable, and even if the ferrule guide holes precisely fit the bare MCFs, it will typically still be necessary to perform a precise, final rotational alignment before the individual MCFs are epoxied into their respective guide holes.

There are now described a number of structures and techniques that provide repeatable, cost-effective ways to achieve this precise, final rotational alignment of individual multicore fibers within their respective ferrule guide holes. Examples of these structures and techniques are described using D-shaped fiber 50, shown in FIG. 5, and ferrule 30, shown in FIGS. 3 and 4. However, it will be appreciated that these examples are not intended to be limiting, and that it would be possible to practice aspects of the invention, with suitable modification as required, with different types of MCFs and ferrules.

Figure 7:
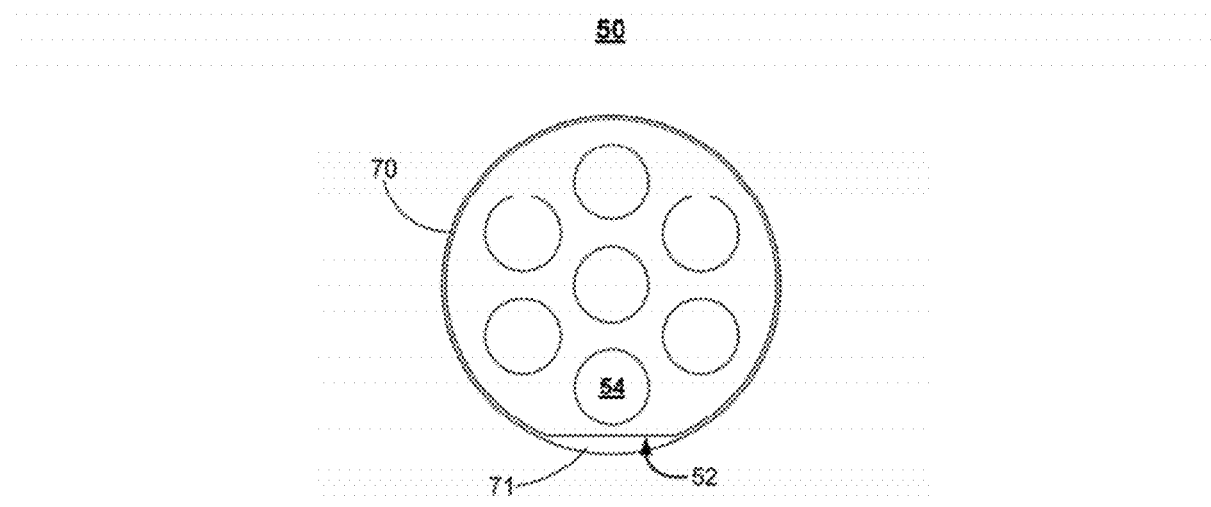
FIG. 7 shows a cross section diagram of the D-shaped MCF shown in FIG. 5.

FIG. 7 shows a cross section diagram of a D-shaped MCF 50, which has seven cores 54, and a flat side surface 52 proximate to one of the cores 54. MCF 50 is loaded into a circular ferrule guide hole 70, similar to ferrule guide holes 40 shown in FIG. 4. It will be seen that although there is a small gap 71 between the fiber's flat side surface 52 and the perimeter of guide hole 70, the guide hole 70 nonetheless provides radial confinement of fiber 50 in all directions.

According to the below-described aspects of the invention, the MCF flat side surface 52 is used to achieve a precise rotational alignment of MCF 50 within circular guide hole 70.

Figure 8:
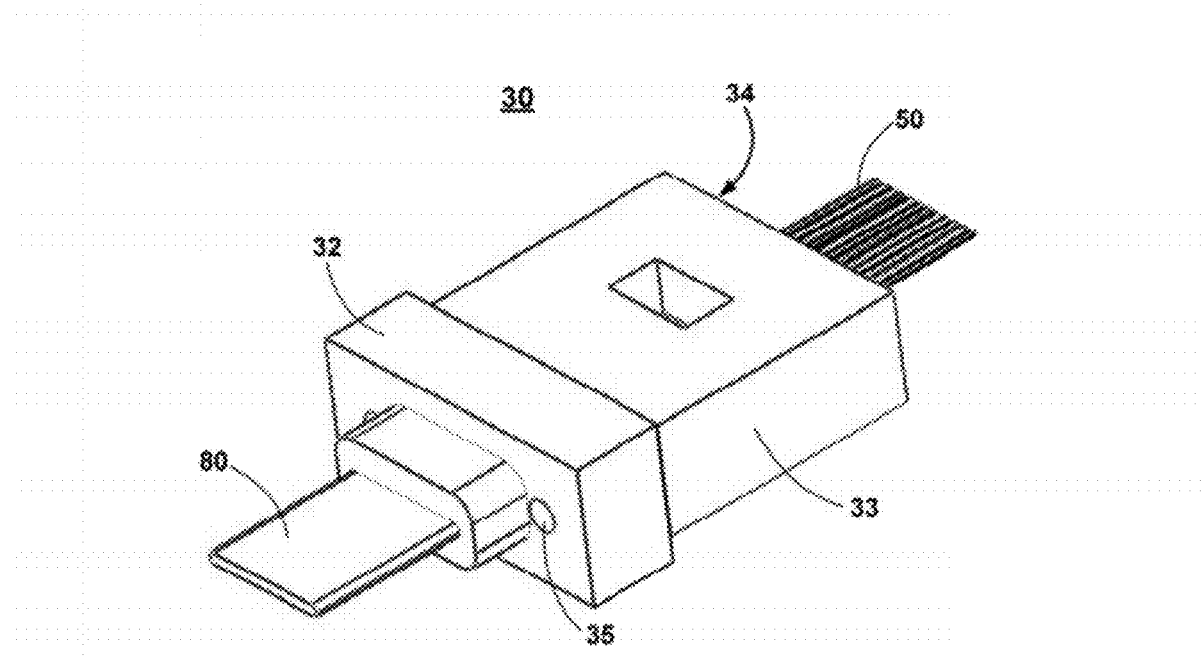
FIG. 8 shows a perspective view of the ferrule shown in FIG. 3, into which there has been loaded a multi-MCF cable containing a plurality of individual MCFs.

FIG. 8 shows a perspective view of ferrule 30, into which there has been loaded a multi-MCF cable 80 containing a plurality of individual MCFs 50. For the purposes of the present description, it is assumed that MCFs 50 are arranged within cable 80 in a side-to-side linear array, and that, within cable 80, the MCFs have a desired rotational alignment, or a substantial approximation thereof, in which the flat side surfaces 52 of all of the fibers 50 are lined up with each other across the array, and all face in the same direction. It should be noted, however, that aspects of the invention may also be practiced with other types of alignment schemes, including schemes in which the respective flat side surfaces of some or all of the individual fibers do not line up with each other.

An end of cable 80 is prepared for connectorization by stripping away the jacket and other protective layers to expose the bare fibers 50. As shown in FIG. 8, the cable is then loaded into ferrule 30, with a certain amount of excess fiber 50 extending out of the ferrule endface. The length of the excess fiber will be dictated by the requirements of the particular alignment technique used.

Figure 9:
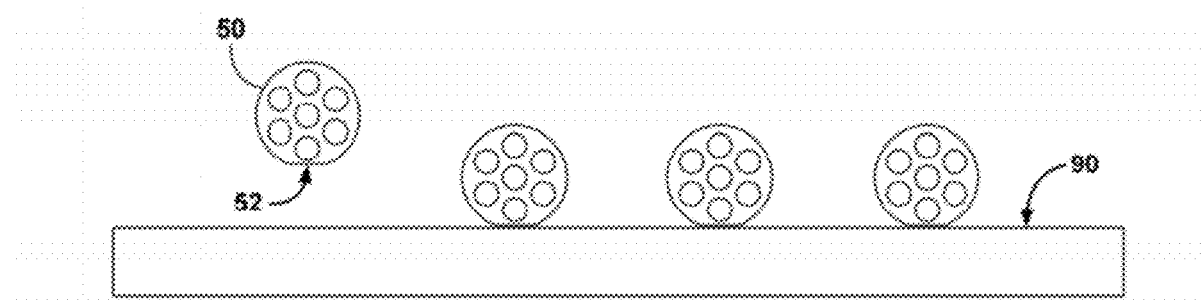
FIG. 9 is a diagram illustrating a general technique for providing alignment of fibers within their respective ferrule guide holes.

FIG. 9 is a diagram illustrating a general technique for providing the above-described final alignment of fibers 50 within their respective ferrule guide holes. According to various aspects of the invention discussed below, ferrule 30 and cable 80 are loaded into an alignment fixture having an alignment surface 90 therein. The alignment surface includes structures for causing the flat side surfaces of the individual fibers 50 to lie flat against the alignment surface 90, thereby causing the individual fibers to be rotationally aligned within their respective guide holes.

Once the final rotational alignment has been performed, epoxy or other suitable material can be injected into the guide holes to hold the fibers in place. The excess fiber can then be trimmed proximate to the ferrule endface, and the trimmed ends can then be polished to produce the desired convex shape for the fiber endfaces.

Four alignment techniques are described: (1) the "ramp" technique; (2) the "tapered slot" technique; (3) the "side-entry slot" technique; and (4) the "wedge" technique. Each technique is described in turn below.

3.1 Ramp Technique

Figure 10A:
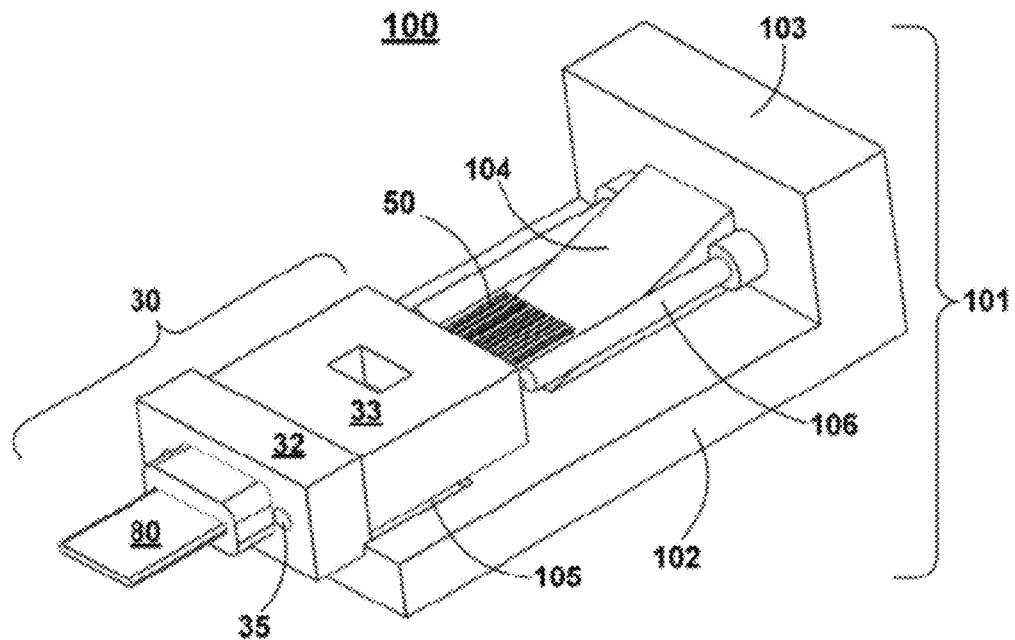
FIGS. 10A and 10B show a perspective view of an alignment fixture employing a "ramp" technique, in accordance with an aspect of the invention.
Figure 10B:
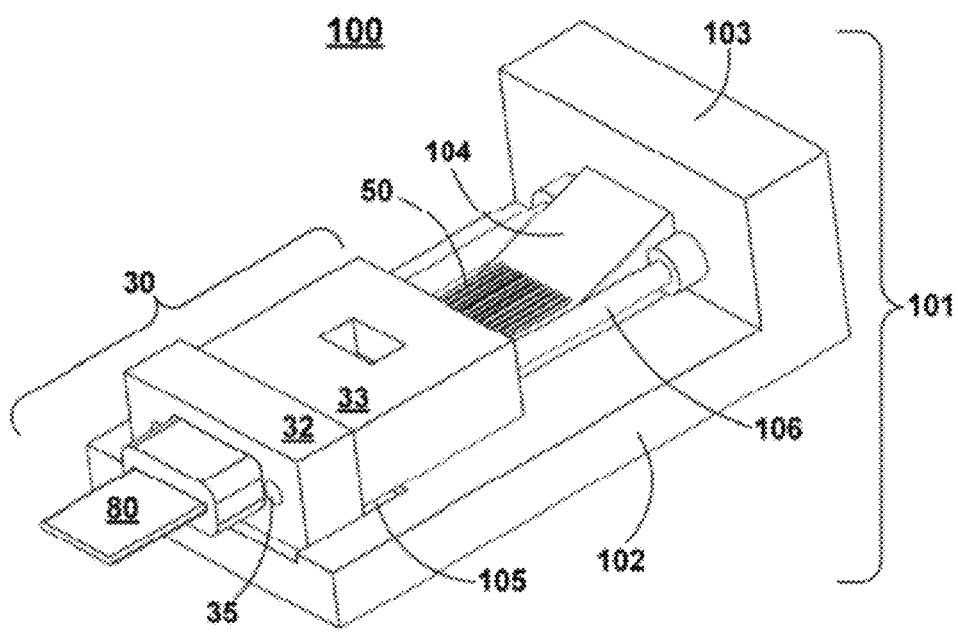

FIGS. 10A-10B shows a perspective view of an alignment fixture 100 employing a "ramp" technique, in accordance with an aspect of the invention. Alignment fixture 100 comprises an L-shaped chassis 101 having a base 102, an upright 103, and a ramp 104. The upper surface of base 102 includes a cutout 105 therein. A pair of MT alignment pins 106 extends from the upright 103, substantially parallel with the upper surface of base 102. Ramp 104 is positioned between the pair of MT alignment pins 106, and provides a smooth transition from a lower front elevation to a higher rear elevation.

Ferrule 30, with protruding fibers 50, is loaded into alignment fixture 100 by positioning the ferrule 30 such that front bottom edge of ferrule head 33 abuts the upper surface of base 102, such that the front bottom edge of ferrule base 32 abuts the front portion of cutout 105, such that the ferrule alignment holes 35 are aligned with alignment pins 106, and such that the exposed ends of bare fiber 50 abut, or are proximate to, the upper surface of ramp 104.

In FIG. 10A, ferrule 30 has been loaded into fixture 100, but fibers 50 have not yet come into contact with ramp 104.

The ferrule 30 is then advanced towards fixture upright 103. The respective shapes of the cutout 105 and the ferrule base 32, and the close fit therebetween, causes the ferrule to be guided along a substantially straight line, whereby alignment pins 106 become seated in holes 35. The movement of the ferrule causes the fiber ends to be urged against the ramp surface. The urging of the fiber ends against the ramp surface causes the fiber flats to become aligned with respect to the ramp surface.

In FIG. 10B, ferrule 30 has been advanced toward fixture upright 103 a sufficient distance to cause fibers 50 to come into contact with ramp 104.

The operation of fixture 100 is illustrated in FIGS. 11A-D. For the purposes of illustration, the amount of rotational alignment has been exaggerated. In actual use, the amount of alignment will be significantly less.

Figure 11A:
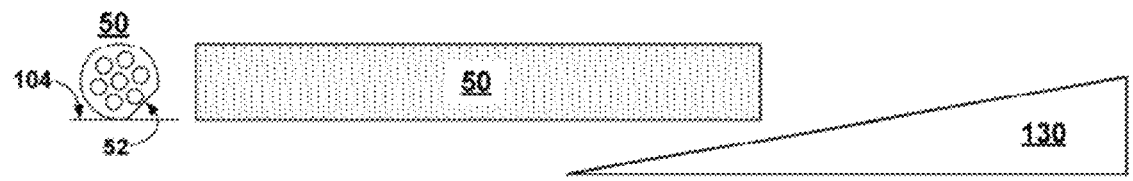
FIGS. 11A-D are a series of diagrams illustrating the operation of the alignment fixture shown in FIGS. 10A-10B.

In FIG. 11A, fiber 50 has not yet made contact with ramp 104.

Figure 11B:
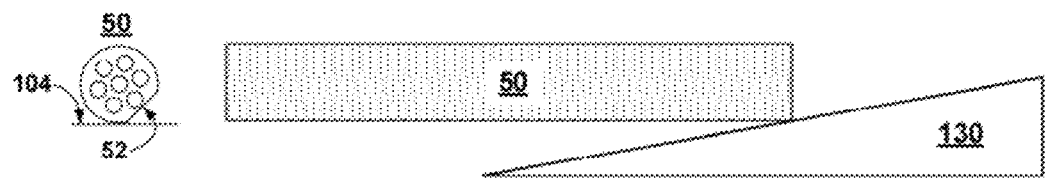

In FIG. 11B, fiber 50 has come into contact with ramp 104.

Figure 11C:
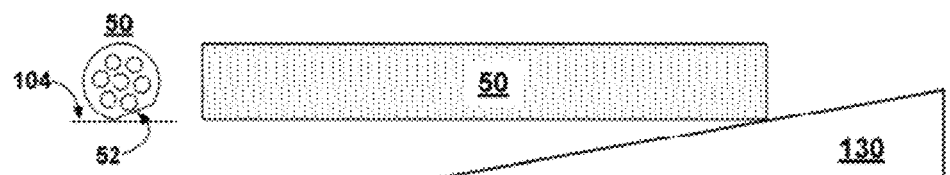

In FIG. 11C, fiber 50 has traveled far enough up ramp 104 to cause a partial rotational alignment of fiber 50.

Figure 11D:
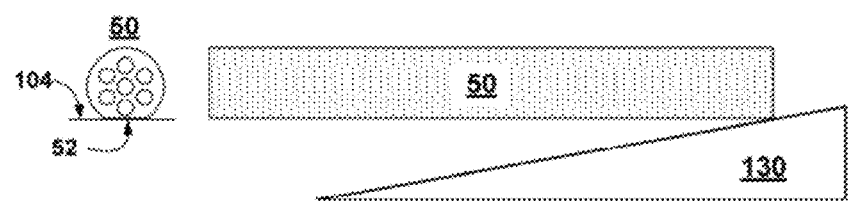

In FIG. 11D, fiber 50 has traveled far enough up ramp 104 to cause complete rotational alignment of fiber 50.

It will be appreciated that the depicted structures may be modified by the inclusion of additional, or different, alignment and retention structures and may be practiced using differently shaped fibers and ramps.

3.2 Tapered Slot Technique

Figure 12A:
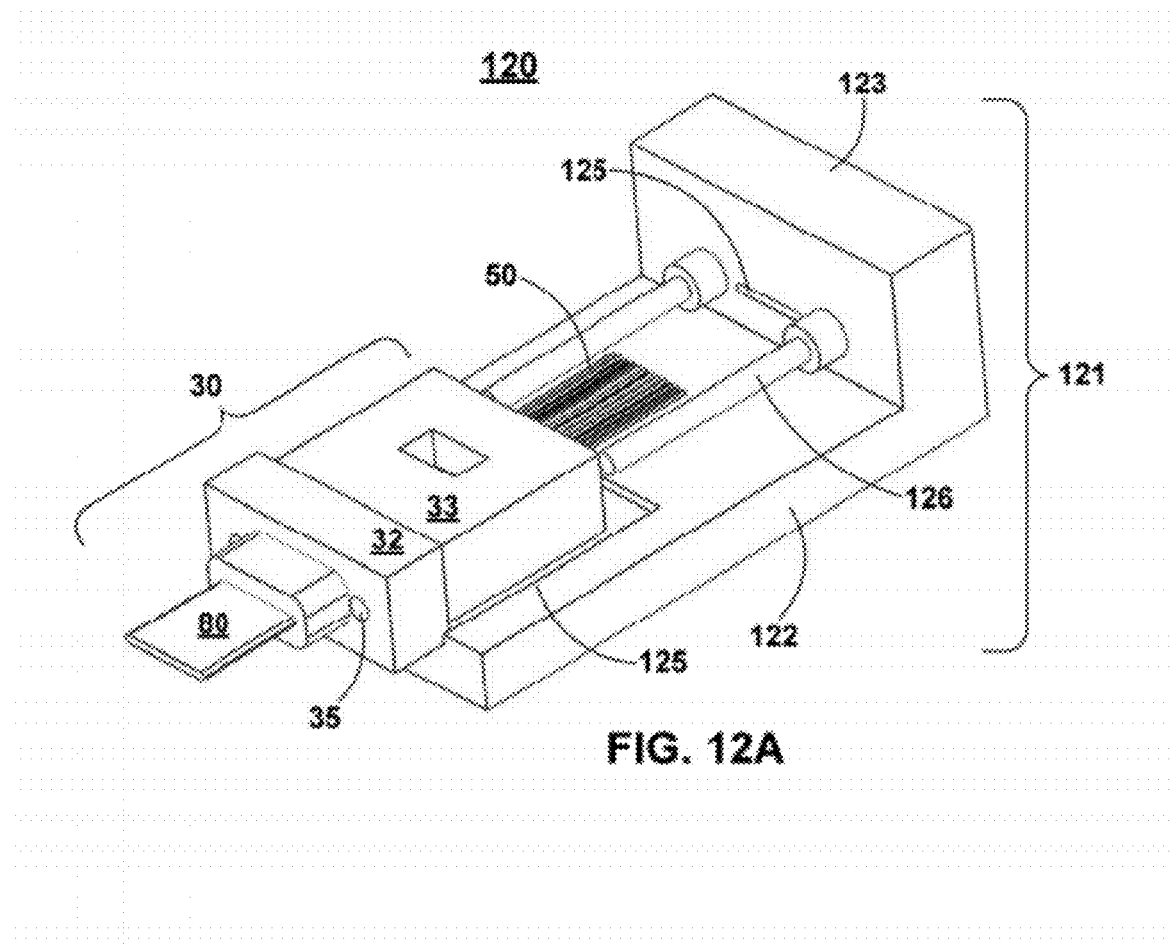
FIGS. 12A-12C show perspective views of an alignment fixture employing a "tapered slot" technique according to a further aspect of the invention.
Figure 12B:
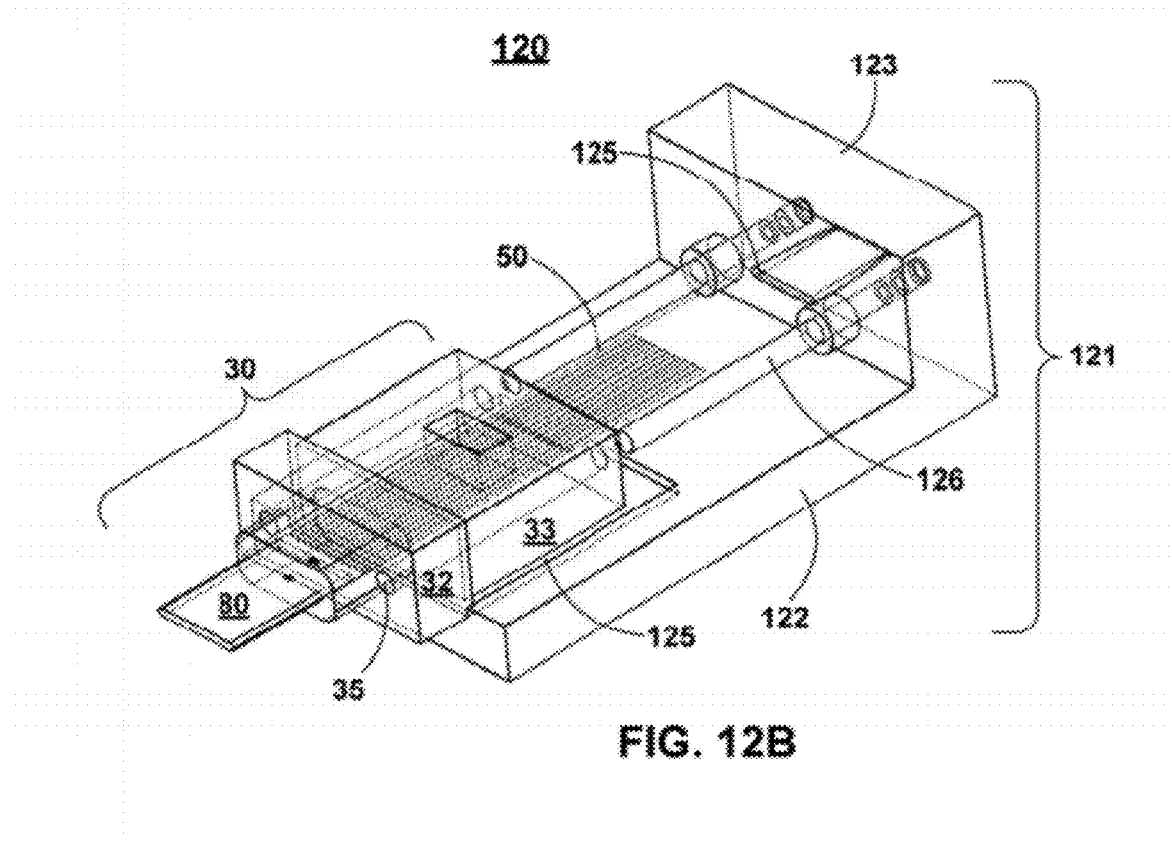
Figure 12C:
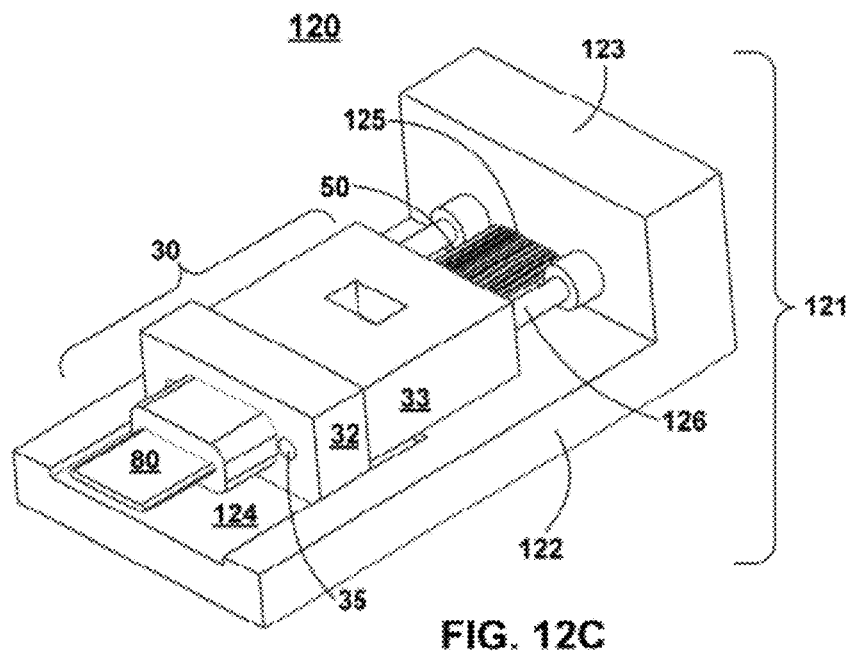

FIGS. 12A-12C show perspective views of an alignment fixture 120 employing a "tapered slot" technique according to a further aspect of the invention. (FIG. 12B shows a wireframe version of FIG. 12A.)

Alignment fixture 120 comprises an L-shaped chassis 121 having a base 122 and an upright 123. The upper surface of base 122 includes a cutout 124 therein. Upright 123 includes a tapered slot 125 generally aligned with exposed fibers 50. A pair of MT alignment pins 126 extends from the upright 123, substantially parallel with the upper surface of base 122. Tapered slot 125 is positioned between the pair of MT alignment pins 126.

Ferrule 30, with protruding fibers 50, is loaded into alignment fixture 120 by positioning the ferrule 30 such that front bottom edge of ferrule head 33 abuts the upper surface of base 122, such that the front bottom edge of ferrule base 32 abuts the front portion of cutout 124, such that the ferrule alignment holes 35 are aligned with alignment pins 126, and such that the exposed ends of bare fiber 50 are generally aligned with tapered slot 125.

In FIGS. 12A and 12B, ferrule 30 has been loaded into fixture 120, but fibers 50 have not yet been seated in tapered slot 125.

The ferrule 30 is then advanced towards fixture upright 123. The respective shapes of the cutout 124 and the ferrule base 32, and the close fit therebetween, causes the ferrule to be guided along a substantially straight line, whereby alignment pins 126 become seated in holes 35. The movement of the ferrule causes the fiber ends to be urged into tapered slot 125.

In FIG. 12C, ferrule 30 has been advanced toward fixture upright 123 a sufficient distance to cause fibers 50 to be fully seated in tapered slot 125.

The front side of the slot has a height that is larger than the diameter of the D-shaped fiber (i.e., greater than 125 μm). The back side of the tapered slot has a height smaller than the fiber O.D. (i.e., less than 125 μm), but barely large enough to allow the D-Shaped fiber to pass through, when the flat is parallel to the slot. Therefore, when the D-shaped fibers are pushed into the slot, the slot will cause the flats of the D-shaped fibers to align horizontally.

Figure 13A:
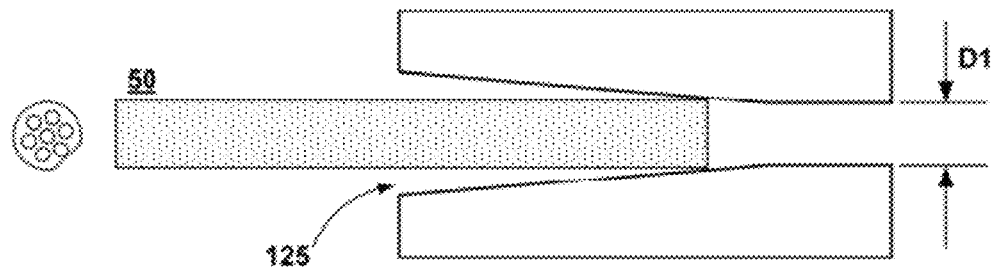
FIGS. 13A and 13B are a pair of diagrams illustrating the operation of the tapered slot technique.
Figure 13B:
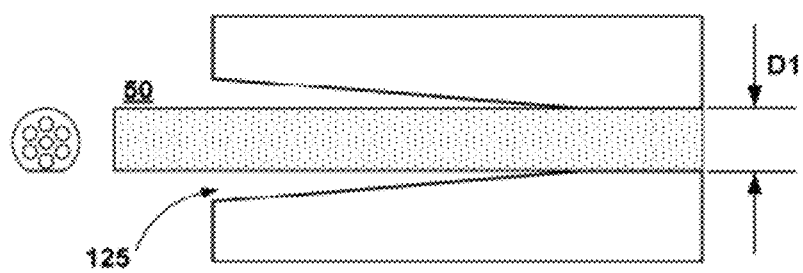

FIGS. 13A and 13B are a pair of diagrams illustrating the operation of the tapered slot technique.

In FIG. 13A, non-aligned fiber 50 only fits part way into tapered slot 125. Urging of fiber 50 deeper into slot 105 causes the fiber 50 to rotate in order to allow it to fit into the narrowed slot.

In FIG. 13B, the fiber 50 has been fully seated into slot 125.

It will be appreciated that the depicted structures may be modified by the inclusion of additional, or different, alignment and retention structures and may be practiced using differently shaped fibers and slots.

3.3 Side-Entry Slot Technique

Figure 14A:
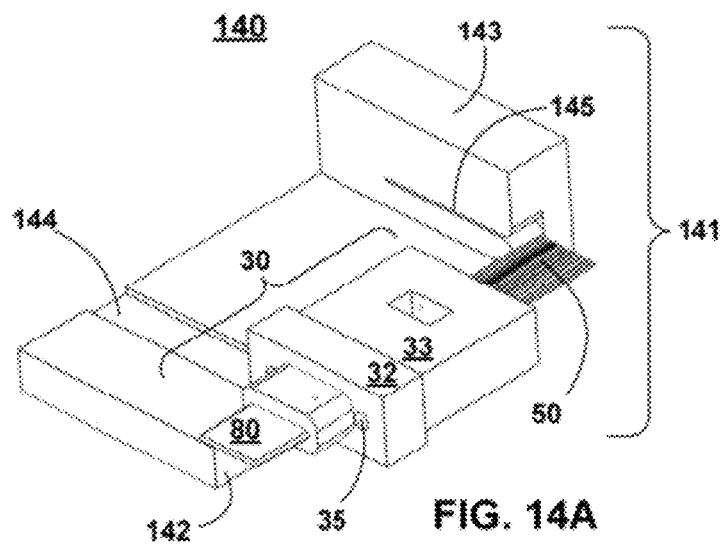
FIGS. 14A and 14B show perspective views of an alignment fixture employing a "side-entry slot" technique, according to a further aspect of the invention.
Figure 14B:
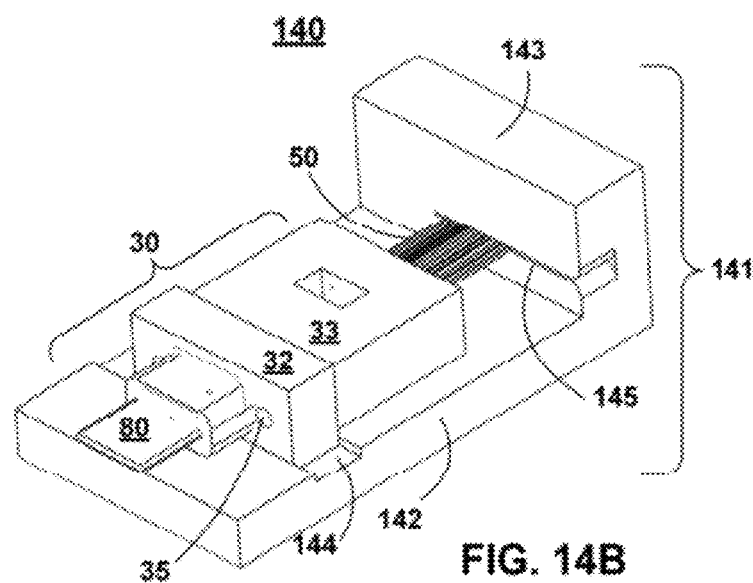

FIGS. 14A and 14B are perspective views of an alignment fixture 140 employing a "side-entry slot" technique, according to a further aspect of the invention. Fixture 140 comprises an L-shaped chassis 141 having a base 142 and an upright 143. The upper surface of base 142 includes a cutout 144 therein. Upright 143 includes a side-entry slot 145 that is substantially parallel to the upper surface of base 142, at a height aligned with the exposed fibers 50 protruding from the endface of ferrule 30.

The ferrule 30, with roughly aligned protruding fibers 50, is loaded into fixture 140 by positioning the ferrule 30 such that the left bottom edge of the ferrule head 33 abuts the upper surface of fixture base 142, such that the left bottom edge of ferrule base 31 is seated in cutout 144, and such that the exposed fibers 50 are in alignment with side-entry slot 145.

Ferrule 30 is advanced in a right-to-left direction. The roughly aligned multicore fibers 50, protruding out of the ferrule endface, are pushed laterally into slot 145. The slot has a height smaller than the fiber outer diameter (i.e., less than 125 μm), but barely large enough to allow the D-Shaped fibers to enter, when the fiber's flat side surface is parallel with the upper and lower surfaces of slot 145. Therefore, when the D-shaped fibers are pushed into the slot, the slot will cause the flats of the D-shaped fibers to align horizontally.

In FIG. 14A, ferrule 30 has been loaded into fixture 140, but protruding fibers 50 have not yet entered slot 145.

In FIG. 14B, ferrule 30 has been advanced far enough into fixture 140 that all of the protruding fibers 50 have been pushed into the narrowest section of the side-entry slot, resulting in the rotational alignment of the fibers within their respective ferrule guide holes.

Figure 15:
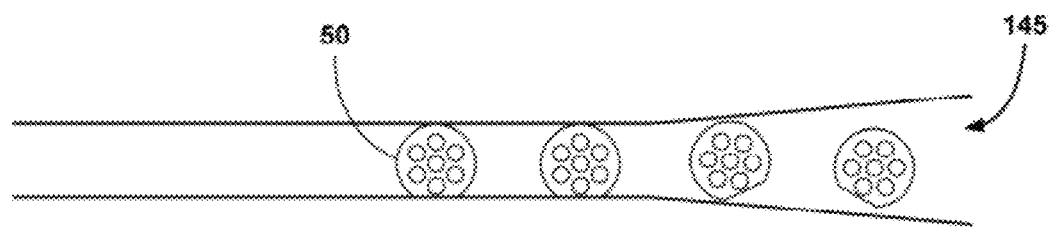
FIG. 15 shows a diagram illustrating the operation of the side-entry slot technique.

FIG. 15 shows a diagram, illustrating the operation of the side-entry slot. As shown in FIG. 15, the lateral movement of fibers 50 into the narrowest section of the slot causes the fibers to be rotated into the orientation required to fit between the upper and lower slot surfaces.

It will be appreciated that the depicted structures may be modified by the inclusion of additional, or different, alignment and retention structures and may be practiced using differently shaped fibers and slots.

3.4 Wedge Technique

Figure 16A:
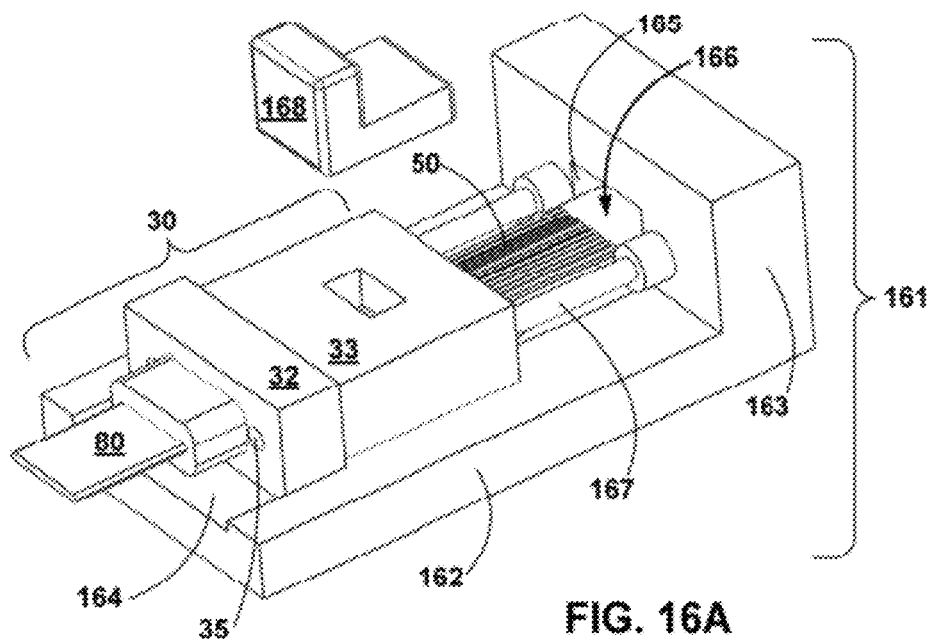
FIGS. 16A and 16B show perspective views an alignment fixture employing a "wedge" technique, according to a further aspect of the invention.
Figure 16B:
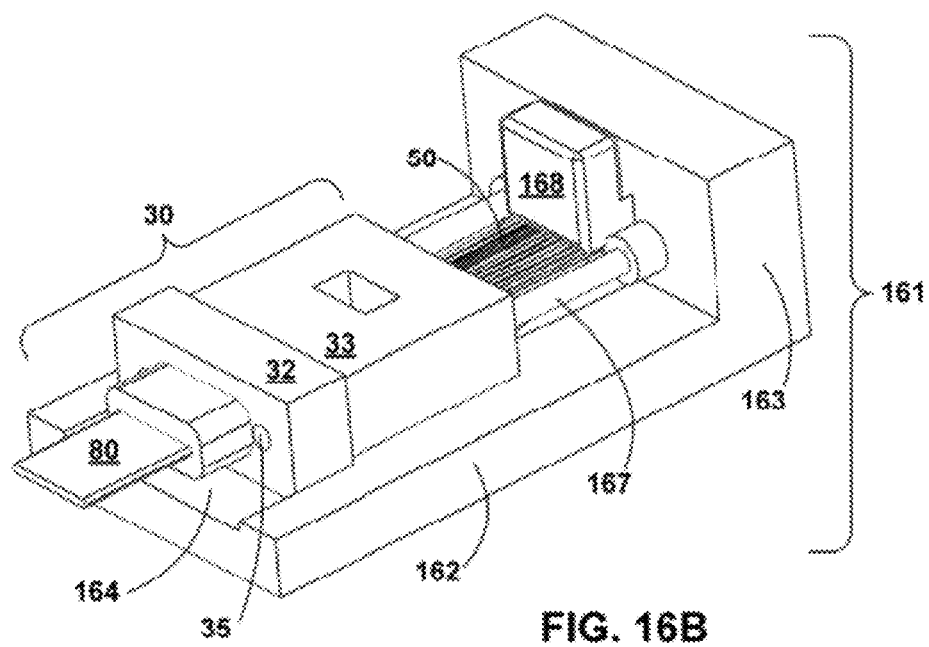

FIGS. 16A and 16B show perspective views of an alignment fixture 160 employing a "wedge" technique, according to a further aspect of the invention. Fixture 160 comprises an L-shaped chassis 161 having a base 162 and an upright 163. The upper surface of base 162 includes a cutout 164 therein. Upright 163 includes a cavity 165 with an inner surface comprising a pedestal 166 that is substantially parallel to the upper surface of base 162, and substantially in alignment with protruding fibers 50. Upright 163 further includes first and second alignment pins 167 at the left and right sides of pedestal 166.

As shown in FIG. 16A, the ferrule 30, with roughly aligned protruding fibers 50, is loaded into fixture 160 by positioning the ferrule 30 such the bottom face of the ferrule base 32 is seated in cutout 164, such that the alignment pins 167 are seated in ferrule holes 35, and such that the front end of the protruding fibers 50 are positioned on top of pedestal 166.

As shown in FIG. 16B, a wedge 168 is inserted into the mouth of cavity 165. The wedge 168 is shaped to fit closely into cavity 165. Thus, pushing wedge 168 into position within cavity 165 places a downward load on the fibers, which causes the flats to align horizontally.

Figure 17A:
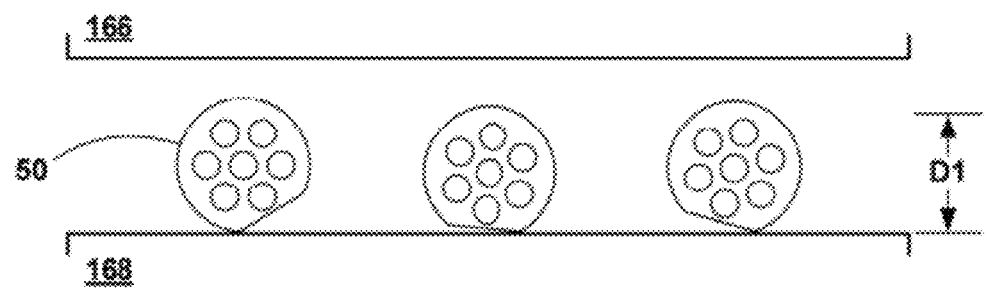
FIGS. 17A-17C are a series of diagrams illustrating the operation of the alignment fixture shown in FIGS. 16A and 16B.
Figure 17B:
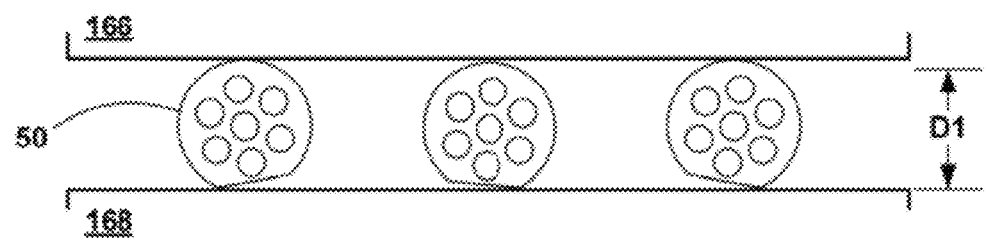
Figure 17C:
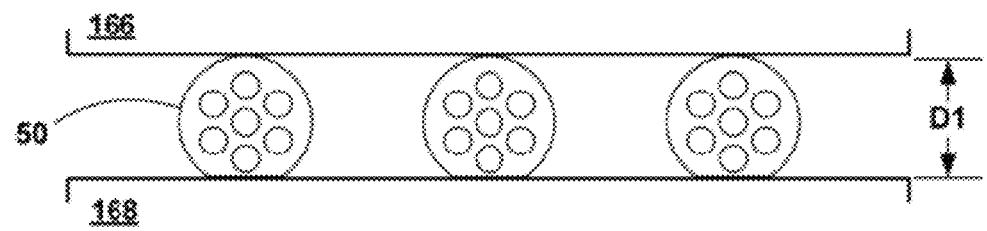

FIGS. 17A-17C are a series of diagrams illustrating the operation of alignment fixture 160.

In FIG. 17A, the wedge has been inserted, but has not yet started to press down on fibers 50.

In FIG. 17B, the wedge has been partially inserted, causing a partial rotational alignment of the fibers 50.

In FIG. 17C, the wedge has been inserted to a depth sufficient to cause complete rotational alignment of the fibers 50.

Here again, other structures incorporating different ferrule retention features are also feasible. Also, spring or clip mechanisms could be used as alternate methods to apply the downward force to the fibers.

4. Multifiber Ferrules with D-Shaped Holes and D-Shaped Fibers

According to a further aspect of the invention, the issue of providing precise rotational alignment of multicore fibers is addressed by producing special multifiber MT ferrules with D-shaped holes, pre-aligned in the desired orientation. These ferrules could be fabricated, for example, using a suitable injection-molding or transfer-molding technique. These special MT ferrules can be fabricated from glass-filled PPS, thermoset epoxy, or any other suitable thermoset or thermoplastic polymer.

Figure 18:
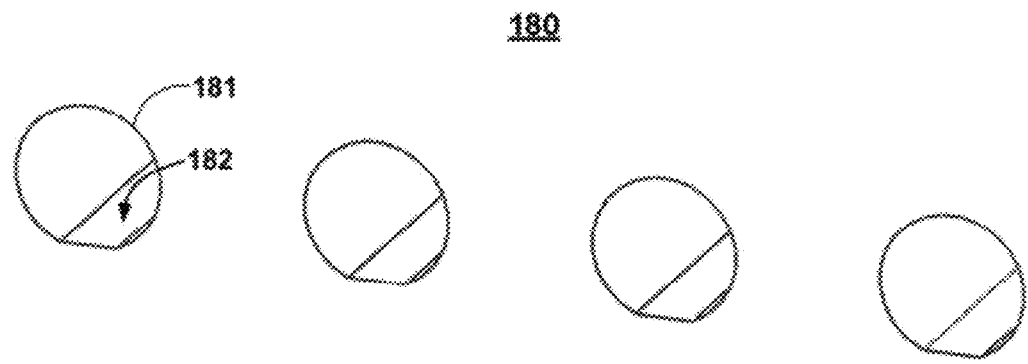
FIG. 18 shows a close-up view of an endface of an MT ferrule endface with pre-aligned D-shaped holes.

FIG. 18 shows a close-up view an endface of an MT ferrule endface with pre-aligned D-shaped holes 181. In this approach, a D-shaped fiber is automatically aligned, upon insertion into the D-shaped holes 181 of the MT ferrule 180, since the fiber flat side surface has to be in line with the hole's corresponding flat side surface 182 in order to facilitate fiber insertion.

Figure 19:
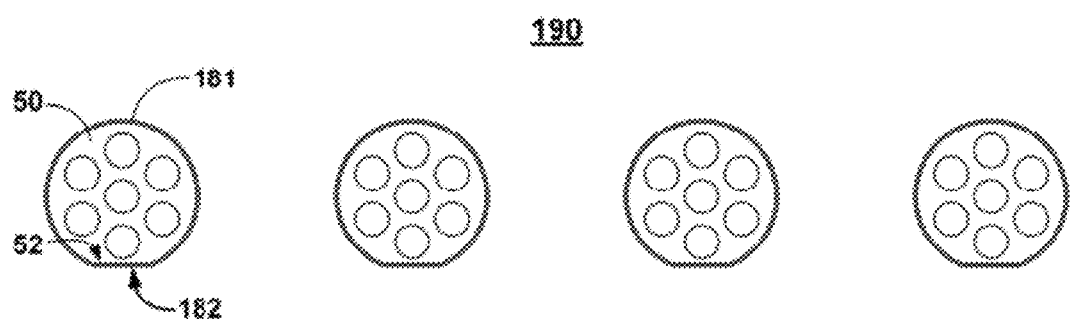
FIG. 19 shows a close-up front view of the endface of the ferrule shown in FIG. 18, with inserted fibers.

FIG. 19 is a close-up front view of the ferrule endface with inserted D-shaped fibers 50.

The depicted ferrule 180 can be modified for use with various other fiber orientations. For example, flat side surfaces on different fibers, in the same ferrule, could be facing different directions. Also, fibers and ferrule holes with two opposing flat surfaces (such as a "double D" configuration) could be used.

5. Multicore Multifiber Connectors Using Polygonal Fibers

While D-shaped fibers will facilitate fiber alignment, alternate fiber geometries that would provide, to varying degrees, similar functionality are feasible. For instance, fibers with polygonal cross sections could also be employed. The flat surfaces of the polygonal fibers would help facilitate core alignment. For instance, square, rectangular, triangular, pentagonal, hexagonal, octagonal, etc., fibers could be used.

Figure 20:
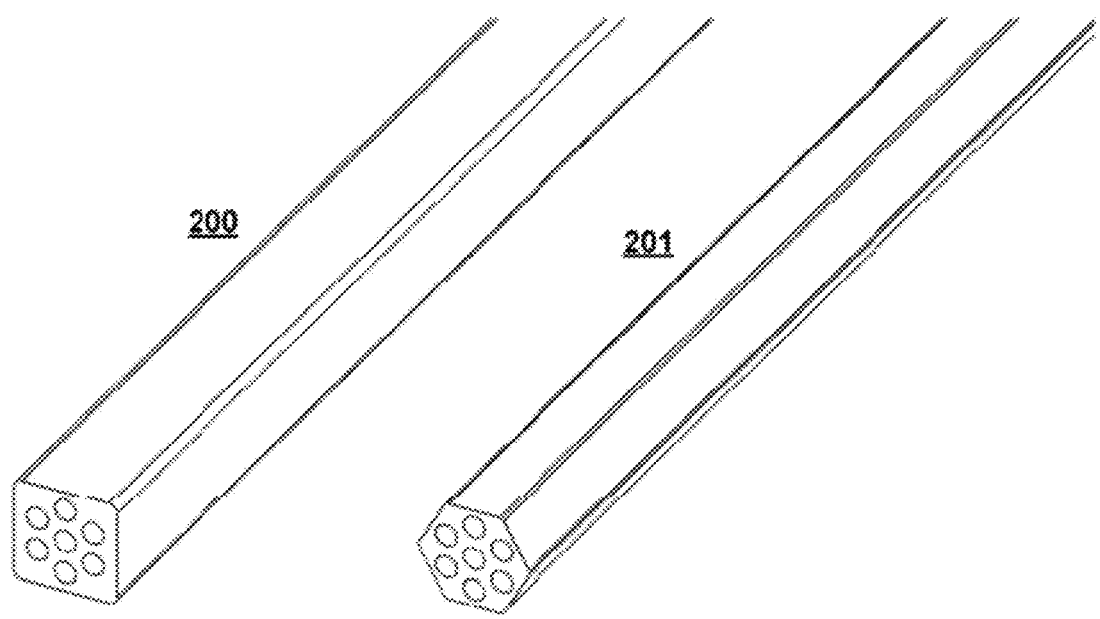
FIG. 20 shows perspective views of multicore fibers having polygonal shapes, according to a further aspect of the invention.

FIG. 20 shows perspective views of a square fiber 200 and a hexagonal fiber 201. Also, special multifiber MT ferrules with polygonal holes could be molded to accommodate and align specific polygonal fibers.

6. Multicore Multifiber Connectors Using other Fiber Shapes

In addition to the fiber geometries already mention (i.e. circular (elliptical), D-shaped, and polygonal), other fiber geometries that would provide, to varying degrees, similar functionality are feasible. For instance, fibers with irregular cross sections (i.e. a combination of curved and flat surfaces) could also be employed. The symmetry or flat surfaces of the fibers would help facilitate core alignment. Here again, special multifiber MT ferrules with irregular holes could be molded to accommodate and align specific fiber geometries.

7. General Techniques

Figure 21:
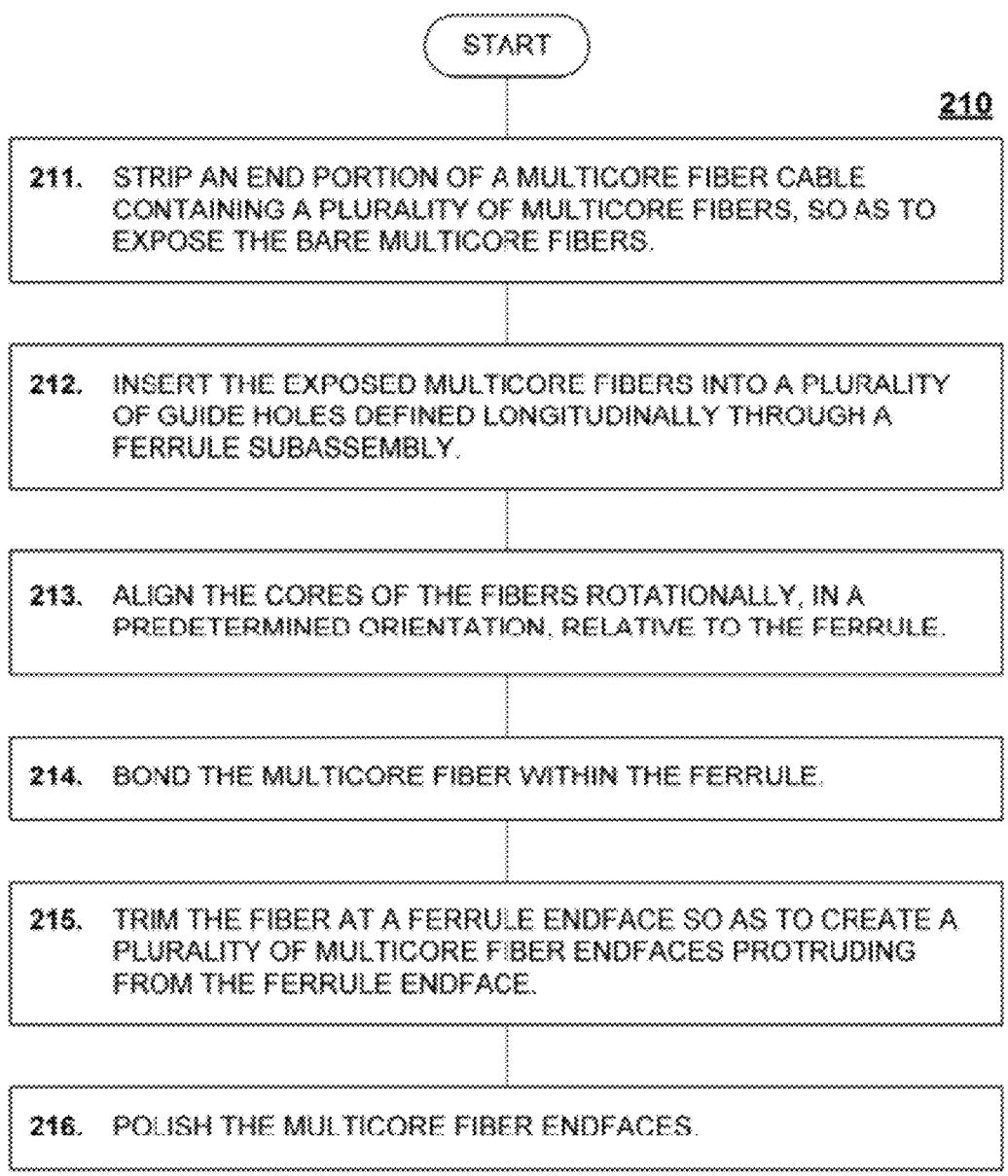
FIGS. 21 and 22 show flowcharts of general techniques according to aspects of the invention.
Figure 22:
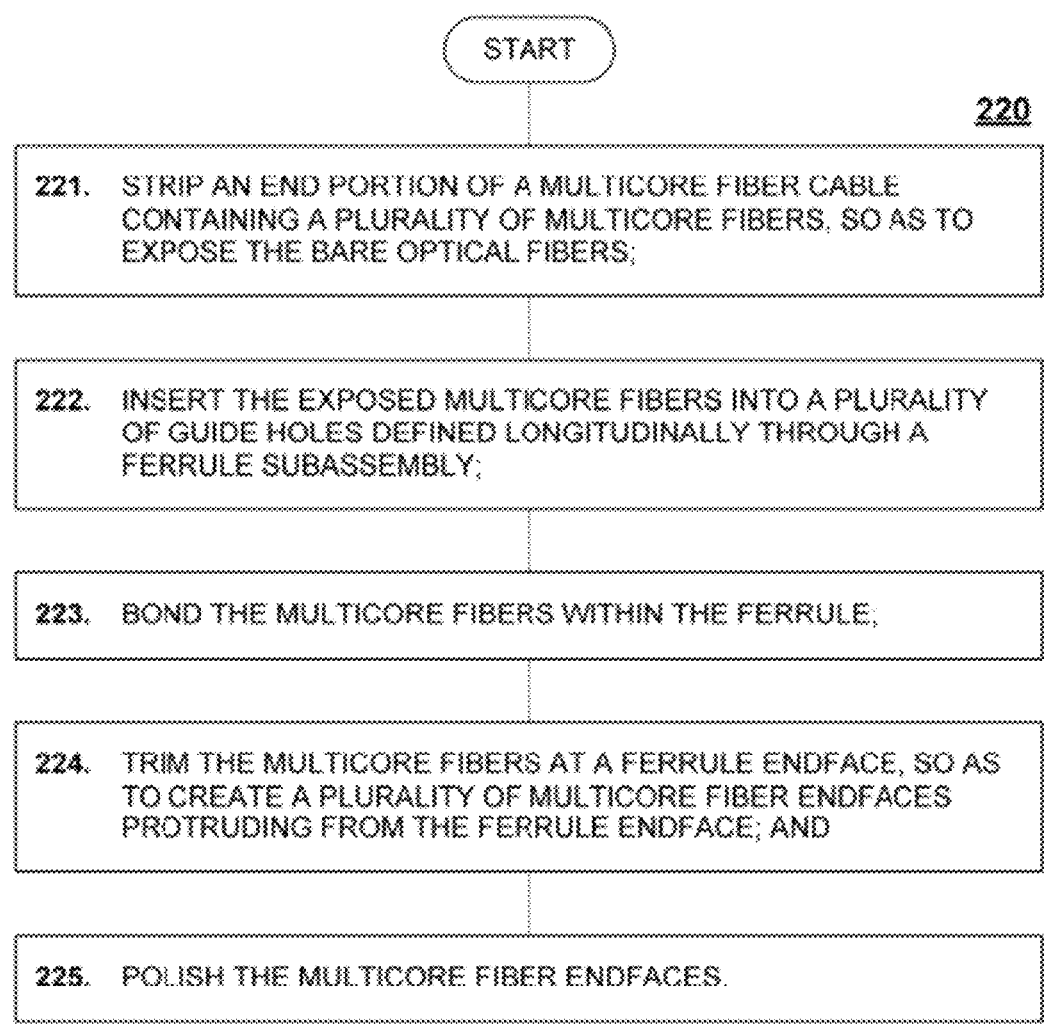

FIGS. 21 and 22 show flowcharts of general techniques 210, 220, according to aspects of the invention. It should be noted that FIGS. 21 and 22 are intended to be exemplary, rather than limiting. The present invention may be practiced in a number of different ways, using different combinations of some or all of the elements set forth in these drawings, as well as combinations including elements not explicitly set forth in these drawings.

FIG. 21 shows a flowchart of a general technique 210, according to aspects of the invention, for aligning multicore fibers within a multifiber ferrule.

General technique 210 comprises the following steps:

211: Strip an end portion of a multicore fiber cable containing a plurality of multicore fibers, so as to expose the bare multicore fibers.

212: Insert the exposed multicore fibers into a plurality of guide holes defined longitudinally through a ferrule subassembly.

213: Align the cores of the fibers rotationally, in a predetermined orientation, relative to the ferrule.

214: Bond the multicore fiber within the ferrule.

215: Trim the fiber at a ferrule endface so as to create a plurality of multicore fiber endfaces protruding from the ferrule endface.

216: Polish the multicore fiber endfaces.

FIG. 21 shows a flowchart of a further general technique 210, according to aspects of the invention, for aligning multicore fibers within a multifiber ferrule.

221: Strip an end portion of a multicore fiber cable containing a plurality of multicore fibers, so as to expose the bare optical fibers.

222: Insert the exposed multicore fibers into a plurality of guide holes defined longitudinally through a ferrule subassembly.

223: Bond the multicore fibers within the ferrule.

224: Trim the multicore fibers at a ferrule endface, so as to create a plurality of multicore fiber endfaces protruding from the ferrule endface.

225: Polish the multicore fiber endfaces.

Section B

Section A, above, describes structures and techniques that provide rotationally aligned connectorization for multicore fibers (MCFs).

Section B expands upon the above description, and provides structures and techniques relating to the connectorization of polarization-maintaining fibers (PMFs). There are also described additional structures and techniques relating to MCFs.

Section B is organized into the following sections:
B1. Alignment of PMFs
B2. Geometrically-Perturbed PMFs
B3. Applicability of Section A to Flat-Sided PMFs
B4. Multi-Fiber Ferrules for Use with Flat-Sided PMFs
B5. Alignment Fixtures
B6. Fiber Block with Array of V-Shaped Grooves
B7. General Techniques
B8. Conclusion B1. Alignment of PMFs Many optical fiber components, such as, for example, interferometers, sensors, lasers, and electro-optic modulators, are polarization-dependent. Even minor alterations in polarization orientation can result in significant swings in the accuracy of responses of such devices.

Changes in light polarization along the length of an optical fiber can be prevented by using a polarization-maintaining fiber (or "PMF"), which is a type of fiber that is designed to have a high birefringence, whereby light travels at significantly different speeds along first and second transmission axes. The higher-speed axis is referred to as the "fast" axis, and the lower-speed axis is referred to as the "slow" axis. If a linearly-polarized light wave is launched as an input into to a PMF, with the direction of polarization parallel to that of one of the two transmission axes, the high birefringence of the fiber will cause the polarization of the light signal to be maintained.

Figure 23:
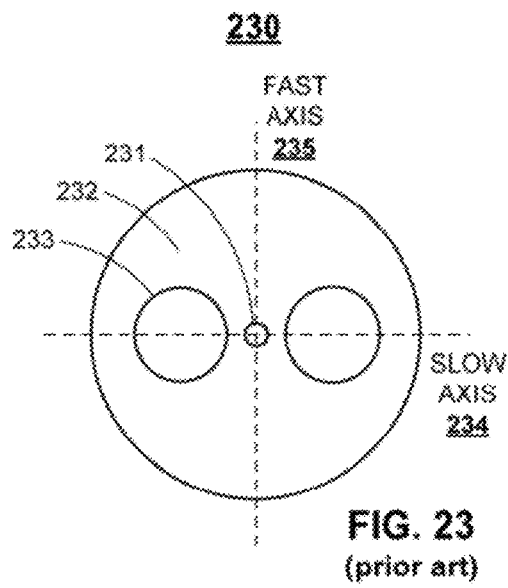
FIG. 23 shows a cross-sectional diagram illustrating a PANDA-type polarization-maintaining fiber according to the prior art.

FIG. 23 shows a cross-sectional diagram illustrating a PANDA ("Polarization-maintaining AND Absorption-reducing") PMF 230, according to the prior art. PANDA fiber 230 includes a central single-mode core 231 surrounded by a cladding 232. Birefringence is introduced into PMF 230 by means of a pair of stress-birefringent lobes 233 that are positioned on opposite sides of the core 231. As shown in FIG. 23, PANDA fiber 230 has a cross-sectional configuration in which core 231 and lobes 233 lie in a straight line 234 across fiber 230 (i.e., across a diameter of fiber 230). The slow axis of the fiber is aligned with line 234. The fast axis 235 is perpendicular to the slow axis 234.

Aspects of the present invention are described with respect to a PANDA fiber. It will be appreciated that the described aspects of the invention may be practiced with other PMF designs including elliptical-core, elliptical-clad, and bow-tie designs, as well as other fibers requiring rotational alignment.

If a first PMF segment is connected to a second PMF segment of PMF, the birefringent axes of the two coupled fiber segments must be precisely aligned at the point of connection in order for the polarization of the light wave to be maintained. Failing to properly align the axes will result in polarization cross-coupling, i.e. crosstalk, which is undesirable. There is thus a need for structures and techniques for providing aligned connection between a PMF and a second optical element.

Also, it is becoming increasingly necessary to provide multifiber connectorization for PMFs, wherein a plurality of PMFs are installed into a single connector structure so as to provide snug, aligned connectivity to each of the respective endfaces of the installed PMFs when the connector is plugged into a mating receptacle, adapter, or like device.

Aspects of the invention are directed to structures and techniques that provide aligned connectorization for PMFs. According to an aspect of the invention, a PMF comprises a conventional cylindrical fiber geometry, into which there has been introduced one or more geometrical perturbations that precisely indicate the rotational orientation of one, or both, of the PMF transmission axes.

It should be noted that the described structures and techniques are application to MCFs, or other fibers requiring alignment to a desired rotational orientation.

B2. Geometrically-Perturbed PMFs

Figure 24A:
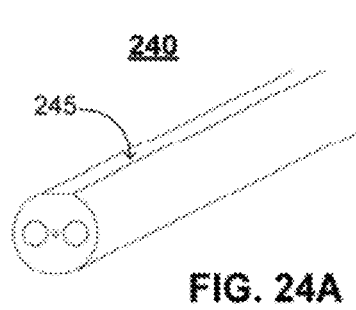
FIGS. 24A and 24B show, respectively, perspective and end views of a polarization-maintaining fiber according to an aspect of the invention having a flat surface aligned with the fiber's slow axis.
Figure 24B:
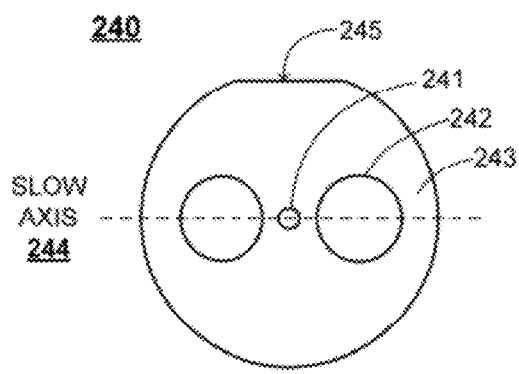

FIGS. 24A and 24B show, respectively, a perspective view and an end view of a PMF 240 according to an aspect of the invention. PMF 240 is based on a PANDA-type design, and comprises a fiber body having a cross sectional profile in which a single-mode core 241 and two stress lobes 242 are arranged in a straight line within a cladding region 243, thereby defining a slow polarization axis 244.

Figure 25A:
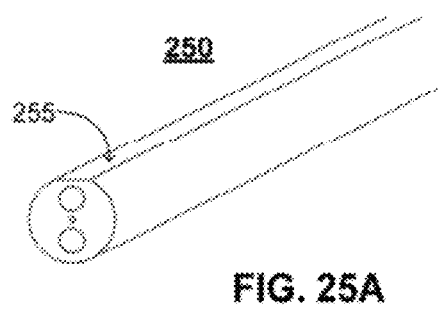
FIGS. 25A and 25B show, respectively, perspective and end views of a polarization-maintaining fiber according to an aspect of the invention having a flat surface aligned with the fiber's fast axis.
Figure 25B:
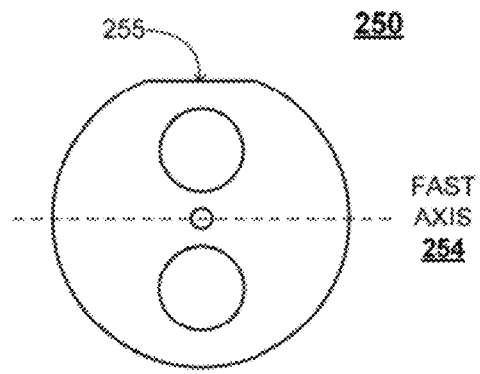

It will be seen that fiber 240 has a substantially cylindrical shape, wherein the fiber's cross sectional profile is substantially circular. A geometrical perturbation has been introduced into the circular cross sectional profile comprising a flat surface 245 extending along one side of the fiber, resulting in a D-shaped profile. In fiber 240, flat surface 245 is aligned with the fiber's slow axis 244. FIGS. 25A and 25B show, respectively, a perspective view and an end view of a PMF in which flat surface 255 is aligned with the fiber's fast axis 254.

It should be noted that a fiber with a "geometrical perturbation" may have any of a number of differently shaped profiles, including a double-D-shaped profile, a polygonal profile, etc.

Figure 26A:
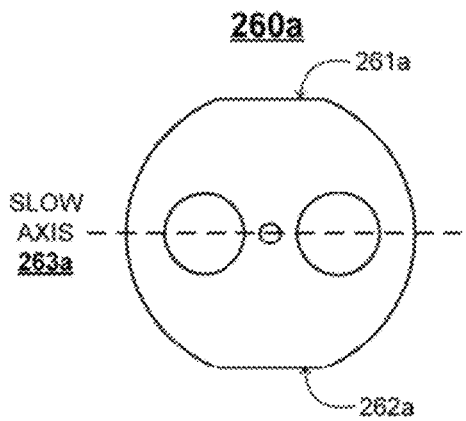
FIGS. 26A and 26B show end views of polarization-maintaining fibers according to an aspect of the invention, comprising a double-D shaped profile.
Figure 26B:
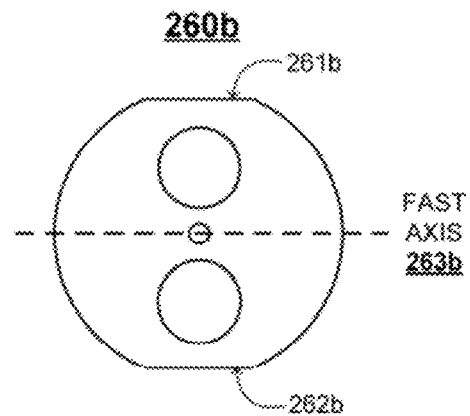

FIGS. 26A and 26B show end views of PMFs 260a and 260b according to an aspect of the invention comprising a double-D shaped profile. In FIG. 26A, the flat sides 261a, 262a are aligned with the slow axis 263a. In FIG. 26B, the flat sides 261b, 262b are aligned with the fast axis 263b.

Figure 27A:
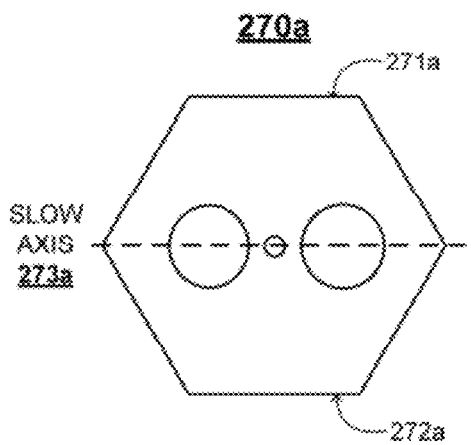
FIGS. 27A and 27B show end views of polarization-maintaining fibers according to an aspect of the invention, comprising a hexagonal profile.
Figure 27B:
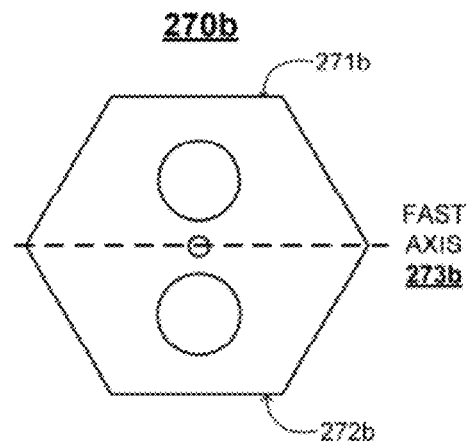

FIGS. 27A and 27B show end views of PMFs 270a and 270b according to an aspect of the invention comprising a polygonal (in this case, hexagonal) profile. In FIG. 27A, the hexagonal profile's top and bottom sides 271a, 272a are aligned with the slow axis 273a. In FIG. 27B, the top and bottom sides 271b, 272b of the hexagonal profiles are aligned with the fast axis 273b.

In FIGS. 24A-B, 25A-B, and 26A-B, the circular portion of the cladding has a diameter of 125 µm. In a practice of the invention, an acrylate dual coating layer (not shown) is applied, having an outer diameter of 250 µm. These diameters are compatible with conventional optical connectivity products. Other cladding diameters (e.g., 80 µm) and geometrical configurations are also feasible.

According to a further aspect of the invention, described below, rotationally aligned connectorization of a flat-sided PMF is achieved by causing the PMF's flat side to be aligned with a "reference surface" in a ferrule, alignment fixture, or the like. Once the fiber has been properly aligned and epoxied into position, the rotational alignment of a selected principal transmission axis (or both principal transmission axes) at an exposed fiber endface, has a known relationship with an outer surface of the ferrule, allowing the ferrule to be seated in an adapter or receptacle so as to provide rotationally aligned connection with a second polarization-maintaining fiber, or other optical component.

In a PM fiber having a geometrical perturbation comprising one or more flat side "reference" surfaces, the reference surface on the fiber cladding must be wide enough to be visually distinguishable and provide sufficient surface area to allow stable contact between the fiber and the flat surfaces of the ferrule, but not so wide as to adversely affect diametrical control during fiber draw, and endface geometry control during connector polishing.

Figure 28:
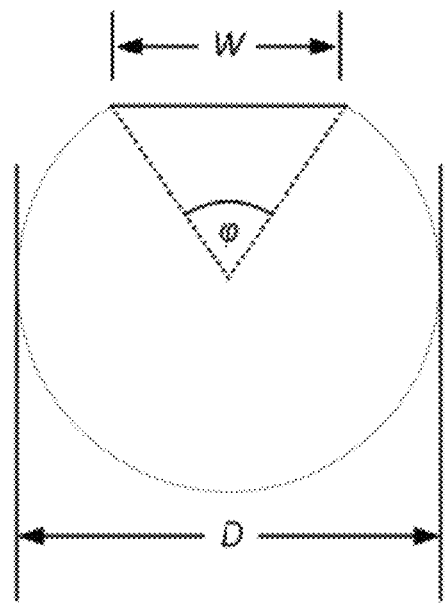
FIG. 28 is a diagram of a typical D-shaped fiber. The flat width w is the length of a chord of the fiber cladding diameter D that subtends central angle $\phi$.

FIG. 28 is a diagram of a typical D-shaped fiber 280. The flat width w is the length of a chord of the fiber cladding diameter D that subtends central angle $\phi$. To meet the functional requirements, the possible range of the angle $\phi$, subtended by the flat side, is $25°<\phi<180°$, where:

$\phi=2 \arcsin (w/D)$.

The preferred range of the angle $\phi$, subtended by the flat side surface, is $40°<\phi<125°$.

Figure 29:
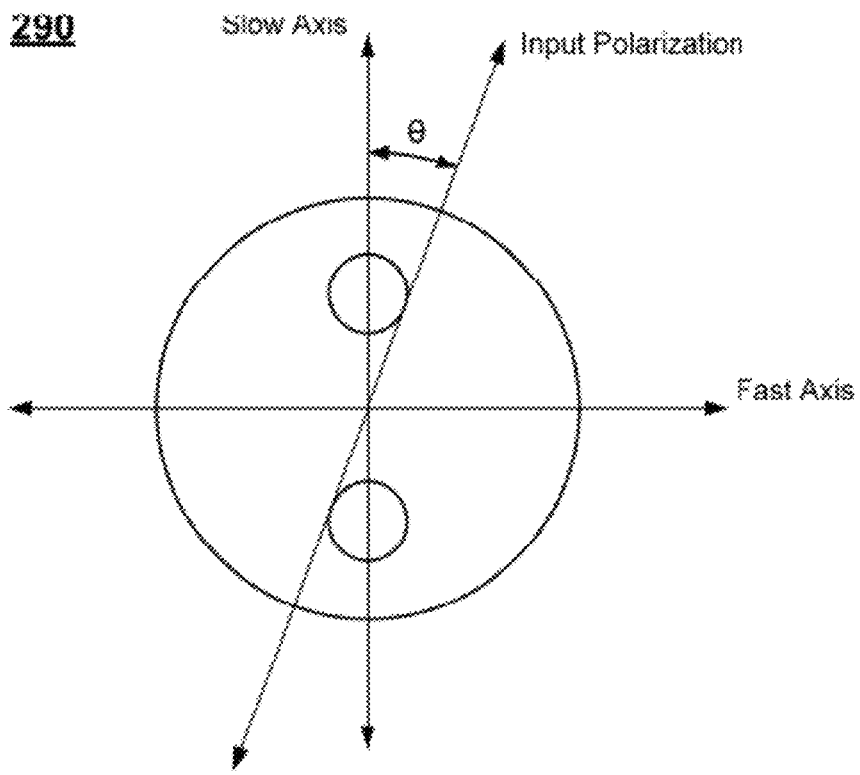
FIG. 29 is a diagram illustrating misalignment between the polarization-maintaining fiber slow axis and the input polarization axis.

FIG. 29 is a diagram illustrating misalignment between the slow axis and the input polarization axis in an exemplary PMF 290. A D-shaped, double-D-shaped, polygonal, or otherwise geometrically perturbed fiber must be aligned such that the rotational misalignment $\theta$ as shown in FIG. 29, between the polarization axis of the input light, from a source or an opposing fiber, and the slow axis of the fiber, is minimized, to achieve an output extinction ratio greater than 20 dB, where the extinction ration (ER) is defined as:

$ER \leq -10 \log (\tan 2\theta)$

Therefore, the rotational misalignment range that provides a minimum extinction ratio of 20 dB is $0°<\theta<6°$ degrees. The preferred range is $0°<\theta<1.8°$, which provides a minimum extinction ratio of 30 dB.

A flat-sided NMF can be fabricated in a number of different ways. An exemplary technique includes the following:

use a modified chemical vapor deposition (MCVD) to create a preform having a core region and a surrounding cladding region;

drill longitudinally extending holes through the cladding, corresponding in position to stress lobes in the drawn fiber;

insert stress rods into the longitudinally extending holes;

grind one or more flat surfaces that extend along one or more sides of the preform, corresponding in position to flat sides of the cross sectional profile of the drawn fiber; and draw the preform into fiber.

B3. Applicability of Section A to Flat-Sided PMFs

As mentioned above, the structures and techniques from Section A can be used in conjunction with, or in addition to, the structures and techniques in Section B.

In particular, it will be seen that the D-shaped PMFs shown in FIGS. 24A-B and 25A-B have outer profiles with substantially the same shape as the D-shaped MCFs 50 and 60 shown in FIGS. 5 and 6, described above in Section A. Thus, the structures and techniques described in Section A with respect to the alignment of MCFs 50 and 60 also apply to PMFs 24A-B and 25A-B in Section B. In addition, it will be seen that the structures and techniques of Section A are also applicable to PMFs having other shapes.

Examples of Section A structures that can be used in conjunction with PMFs include the following:

MT ferrule 30 shown in FIGS. 3 and 4 with D-shaped holes 181, as illustrated in FIGS. 18 and 19;

MT ferrule 30 shown in FIGS. 3 and 4 with round guide holes 70, as illustrated in FIG. 7;

generic alignment technique 80 illustrated in FIGS. 8 and 9;

ramped alignment fixture 100 illustrated in FIGS. 10A-B, and 11A-D;

slot alignment fixture 120 illustrated in FIGS. 12A-C and 13A-13B;

side slot 140 fixture in FIGS. 14A-B and 15;

block alignment fixture 160 illustrated in FIGS. 16A-16B and 17A-C.

B4. Multi-Fiber Ferrules for Use with Flat-Sided PMFs

There are now described exemplary ferrules for use with flat-sided PMFs, according to a further aspect of the invention, in the context of mechanical transfer (MT) ferrule designs. It will be appreciated that the structures and techniques may be used in conjunction with types of connectors.

MT ferrules are available in numerous sizes with various hole counts, for use in conjunction with corresponding connector housings to address a wide range of connector and signal routing applications. For example, the mini MT2 and mini MT4 are used in MT-RJ patch cords. The MT4, MT8, and MT12 are used in one-dimensional array MPO and MPX patch cords. For even higher densities, manufacturers terminate fibers into 2D-array ferrules, such as the MT16, MT24, MT48, MT60, or MT72.

Aspects of the invention are described with respect to exemplary MT ferrules generally of the type illustrated in FIGS. 3-4, 8, and 18-19 and discussed in Section A. The depicted MT ferrules are configured to provide connectorization for an optical fiber ribbon cable comprising a 1×12 linear array of fibers. A typical core-to-core distance between fibers (i.e., the "pitch") is 250 µm.

As discussed above, the FIG. 3 ferrule 30 comprises a molded plastic body including a block-shaped base 32 and head 33. A plurality of guide holes, arranged side-to-side in a linear array, extends through the ferrule head 33 terminating at ferrule endface 34. Guide holes are shaped and dimensioned to closely receive a corresponding plurality of fibers 31.

Figure 30:
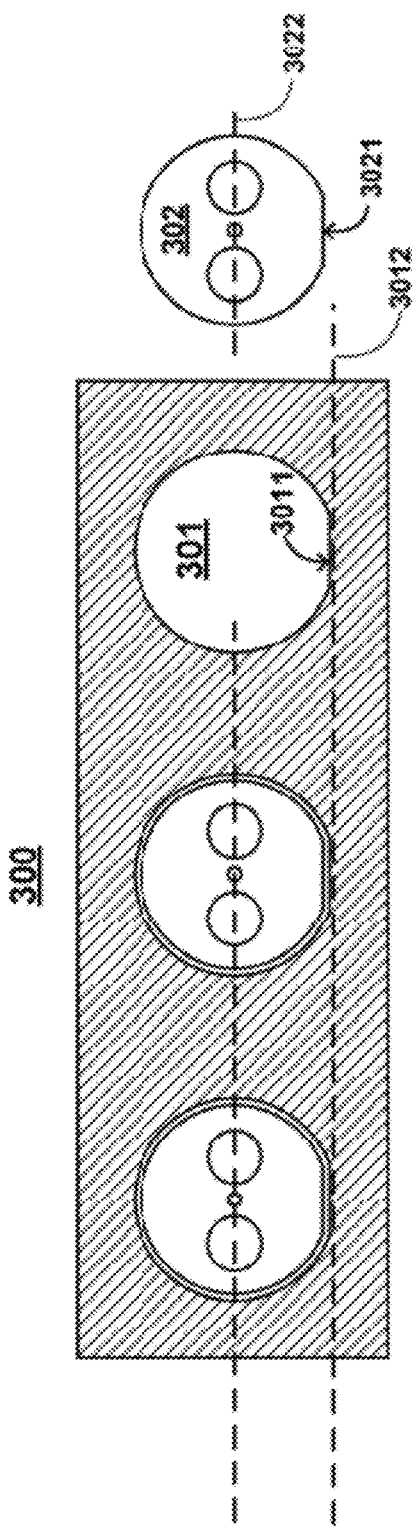
FIGS. 30 and 31 show cross section views of a ferrule portion having, respectively, flat-sided and round guide holes into which flat-sided polarization-maintaining fibers are installed, according to an aspect of the invention.

FIG. 30 illustrates a portion of an MT ferrule endface 300 having a plurality of flat-sided guide holes 301 into which are a corresponding plurality of flat-sided PMFs 302. Each PMF 302 has a generally D-shaped profile, including a flat side surface 3021 extending along the length of the fiber, wherein the flat surface 3021 indicates the rotational orientation of a fiber polarization axis 3022. In the depicted example, PMF 302 is configured such that flat surface 3021 is parallel to, and thus directly indicative of the alignment of, the fiber's slow polarization axis 3022. It will be appreciated that other configurations may be used, including configurations in which the PMF flat side surface 3021 indicates the rotational orientation of the fiber's fast axis, or configurations in which the flat surface 3021 has a different geometrical relationship to the indicated polarization axis.

Each guide hole 301 is shaped to closely receive a respective PMFs 302, and is provided with a flat side surface 3011 corresponding in position to the fiber flat surface 3021. Guide holes 301 and PMFs 302 are configured to have a close enough fit such that each PMF 302 can be installed in its respective guide hole 301 in a rotational orientation in which its flat surface 3021 abuts respective guide hole surface 3011, and such that each PMF 302 is rotationally confined within its respective guide hole 301.

The guide hole's flat side 3011 provides a reference surface extending along one side of guide hole 301. Thus, by configuring the guide hole 301 such that its side surface 3011 has a known relationship with one or more outer surfaces of the ferrule, it is possible to achieve a desired rotational orientation for the PMF relative to the ferrule outer surface, such that when the PMF is subsequently connected to a second PMF, or other component, the two PMFs will have rotationally aligned transmission axes. In the depicted example, as indicated by broken line 3012, the respective flat reference surfaces 3011 of each guide hole 301 are all substantially coplanar.

Each PMF 302 is installed into a respective guide hole 301, such that a portion of bare fiber extends out of the ferrule endface. The fibers can then be epoxied into position. The tips of the fiber are then trimmed and polished. For reliable connections between first and second PMFs, all of the PMF cores must be in contact, under pressure, when the two multifiber connectors are mated. When connectors are polished, the endfaces of the multifiber ferrules are not perfectly square and flat, thus contact pressure is required to deform (i.e., flatten) the end enough to allow all fiber cores to fully meet. Also, the fibers must protrude from the ferrule endface some minimum distance to ensure contact and overcome fiber-to-fiber height variation. This is achieved by polishing the multifiber ferrules so the fibers consistently protrude above the surface of the ferrule. Thus, after polishing, the PMFs will typically protrude from the ferrule endface a distance ranging from 1 to 15 μm. It is noted that in certain applications, it may be desired to trim and polish the fiber to be flush with the endface, or to be recessed within the ferrule body.

B5. Alignment Fixtures

Figure 31:
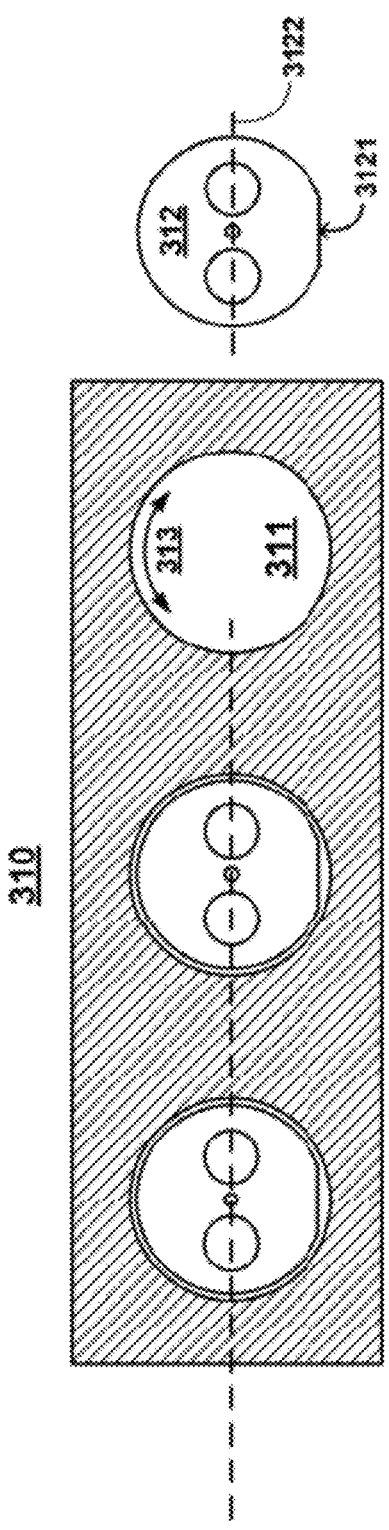

FIG. 31 illustrates a portion of an MT ferrule endface 310 having a plurality of round guide holes 311 into which are installed a corresponding plurality of flat-sided PMFs 312 have respective flat side surfaces 3121 indicating the rotational orientation of a transmission axis 3122. In the depicted example, flat surface 3121 indicates the orientation of the fiber's slow axis 3122. As illustrated by double-headed arrow 313, prior to being epoxied into position, each PMF 312 is rotatable around its longitudinal axis.

According to an aspect of the invention, ferrule 310 is used in conjunction with an alignment fixture, or like device, that provides alignment of the installed fibers 312 within their respective guide holes. Once aligned, the fibers are held in position using epoxy or other suitable adhesive, and then trimmed and polished as described above in connection with ferrule 300 (FIG. 30).

Figure 32A:
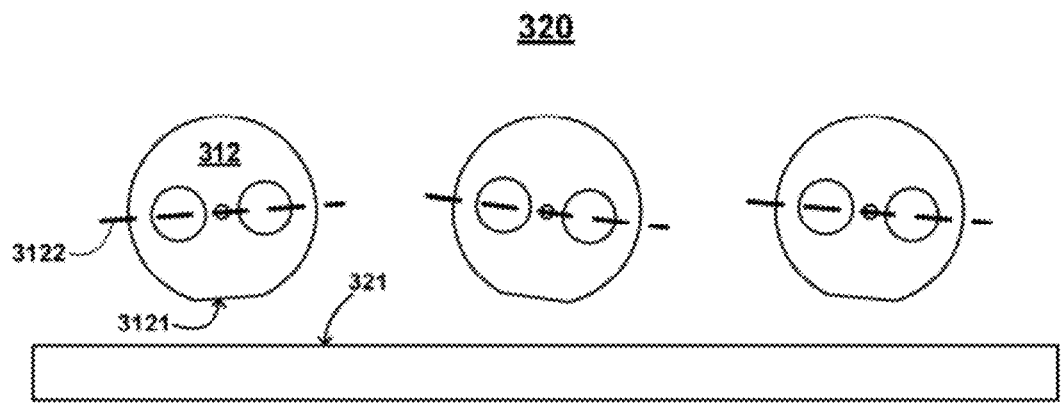
FIGS. 32A and 32B illustrate a generic alignment system according to a further aspect of the invention that can be used in conjunction with the ferrule shown in FIG. 31.
Figure 32B:
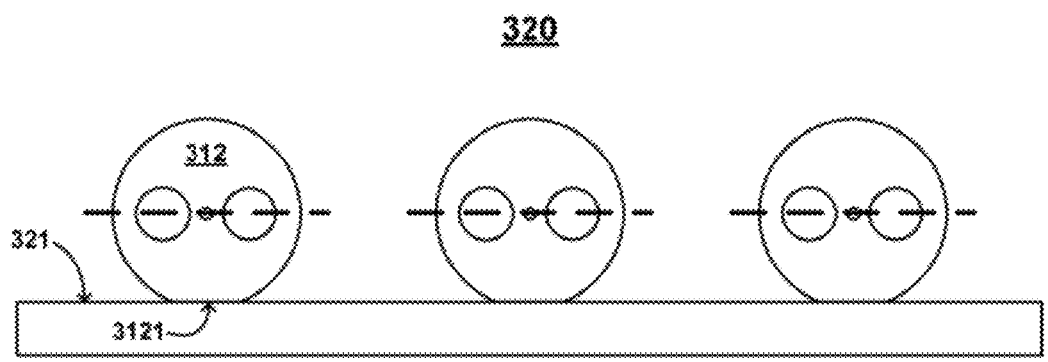

FIGS. 32A and 32B illustrate a generic alignment system 320 according to a further aspect of the invention that can be used in conjunction with ferrule 310 (FIG. 31) or other connector structure requiring rotational alignment of a PMF within a guide hole. PMFs 312 are loaded into the ferrule guide holes 311, such that a portion of the bare PMF extends beyond the ferrule endface 310. The bare PMFs are then urged against a reference surface 321, so as to cause the PMF flat side surfaces 3121 to abut, and become aligned with, the reference surface 321, thereby bringing the respective transmission axes of the PMFs 3122 into rotational alignment.

As noted above, the alignment fixtures described in Section A may also be used in conjunction with flat-sided PMFs, i.e.: ramped alignment fixture 100 illustrated in FIGS. 10A-B, and 11A-D; slot alignment fixture 120 illustrated in FIGS. 12A-C and 13A-13B; side slot 140 fixture in FIGS. 14A-B and 15; and block alignment fixture 160 illustrated in FIGS. 16A-16B and 17A-C. Each of these fixtures generally operates in accordance with the generic alignment system 320 described above.

B6. Fiber Block with Array of V-Shaped Grooves

There are now described structures and techniques in which the above-described geometrically perturbed MCFs and PMFs are used in conjunction with an array of V-shaped grooves to provide rotationally aligned connectorization for those fibers. The structures and techniques described herein utilize mechanical features inherent to the fiber designs to facilitate alignment, thereby reducing assembly difficulty and cost.

Figure 33A:
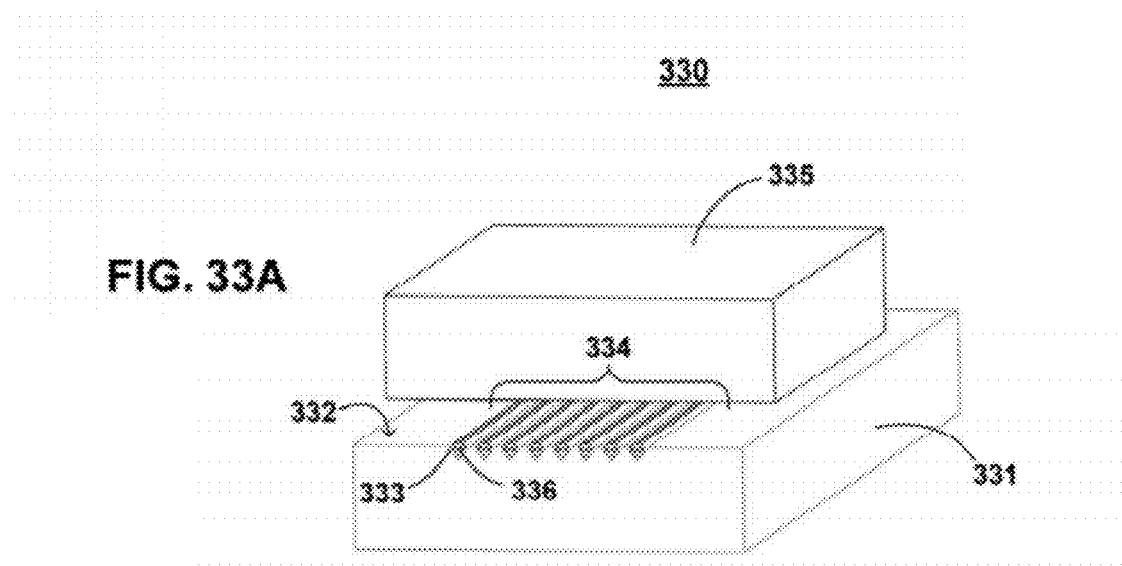
FIGS. 33A-33C show a series of views of an exemplary 8-fiber V-groove assembly, into which eight polarization-maintaining fibers have been installed.
Figure 33B:
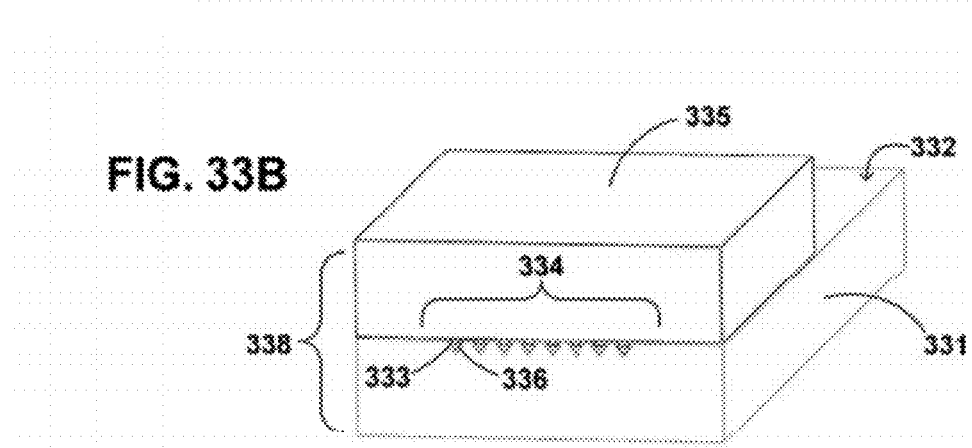
Figure 33C:
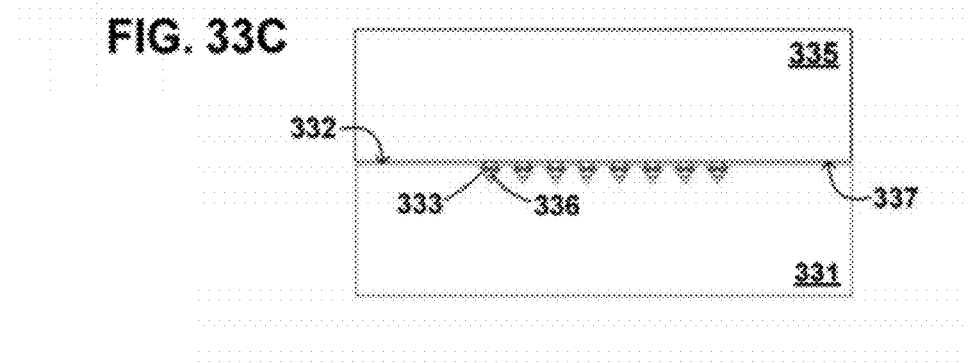
Figure 34A:
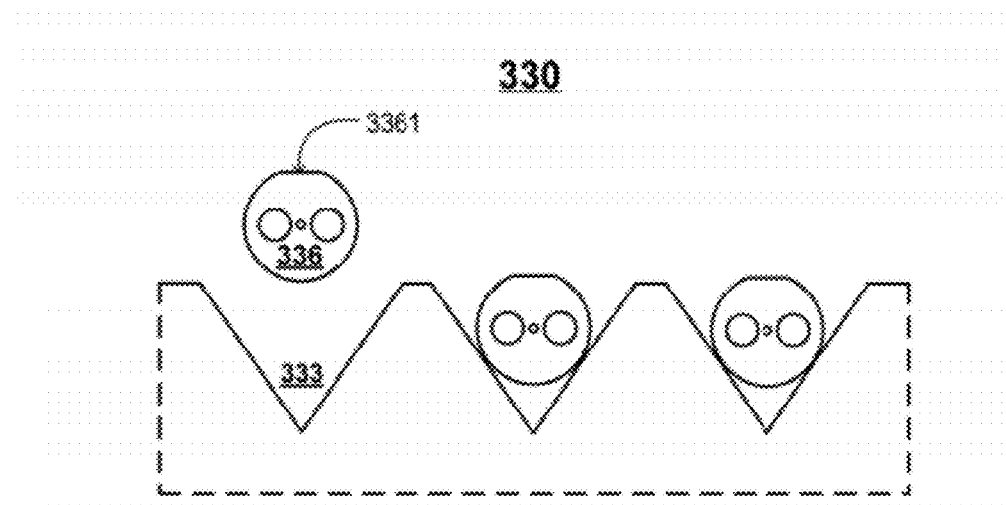
FIGS. 34A-34C show a series of views illustrating a generic alignment method according to a further aspect of the invention that can be used in conjunction with the V-groove assemblies shown in FIGS. 33A-33C.
Figure 34B:
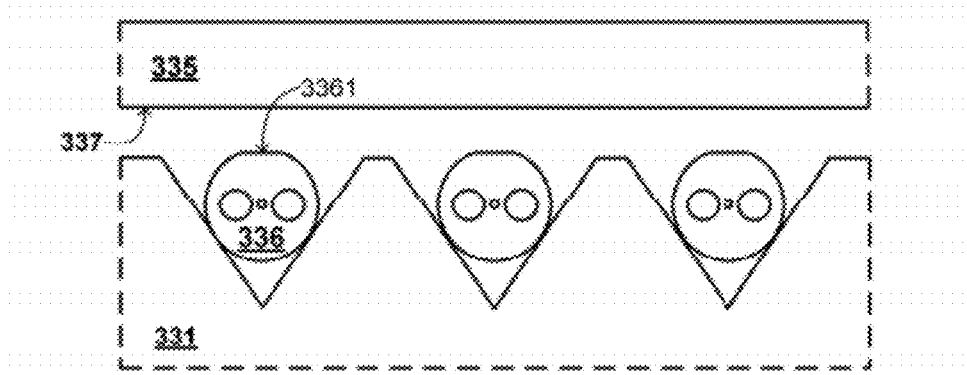
Figure 34C:
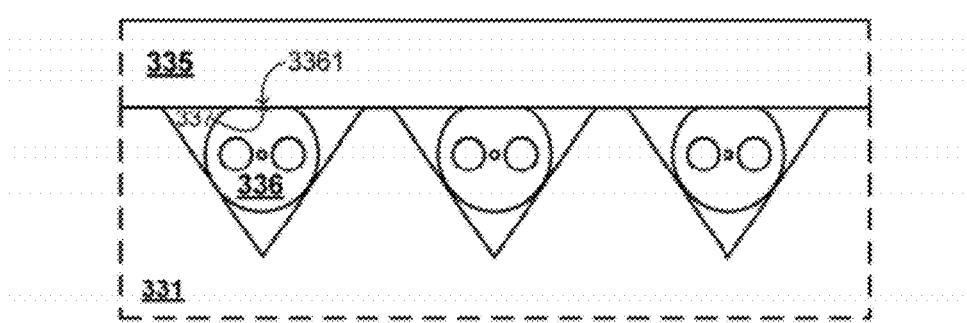

FIGS. 33A-33C show a perspective view of an exemplary 8-fiber V-groove assembly 330, and FIGS. 34A-34C are a series of drawings illustrating the installation of exemplary D-shaped fibers into respective V-shaped grooves.

The V-groove substrate 330 comprises a rigid block 331 formed from glass, silica, or the like, having an exposed surface 332 comprising a plurality of V-shaped grooves 333, arranged side-to-side in a linear array 334. A lid 335 fits over block 331, and is configured such that PMFs 336 loaded into grooves 333 are held in position by the lid's bottom side 337, which provides an alignment reference surface.

As illustrated in FIGS. 33A and 33B, lid 335 is slidable along the top surface of block 331. In FIG. 33A, lid 335 is positioned toward the rear of block 331, thereby exposing the loaded fibers 336. This configuration can be used, for example, to add epoxy or other adhesive material to fibers 336 loaded into the grooves 333. In FIG. 33B, lid 335 is positioned at the front of block 331, whereby the front surfaces of block 331 and lid 335 form a composite assembly endface 338.

Prior to the fibers 336 being bonded to the V-groove substrate with epoxy, each fiber must be positioned with respect to the substrate such that the stress rods of each fiber are aligned in a pre-determined orientation. For instance, each fiber could be oriented so that the stress rods are vertically opposed (i.e. at the 12 o'clock and 6 o'clock positions) or horizontally opposed, as shown in the figure. To achieve alignment, D-shaped PMFs 336 are positioned in each V-groove 333 with the flats 3361 roughly aligned, such that when the lid 335 is installed, as shown in FIGS. 34A-C, the flat 3361 on each D-Shaped PMF 336 is urged into alignment parallel to the plane formed by the lid's bottom surface 337. Alternatively, the fibers 336 could be oriented such that the flats 3361 on one or more fibers rest against either of the side walls forming the V-grooves 333.

B7. General Techniques

Figure 35:
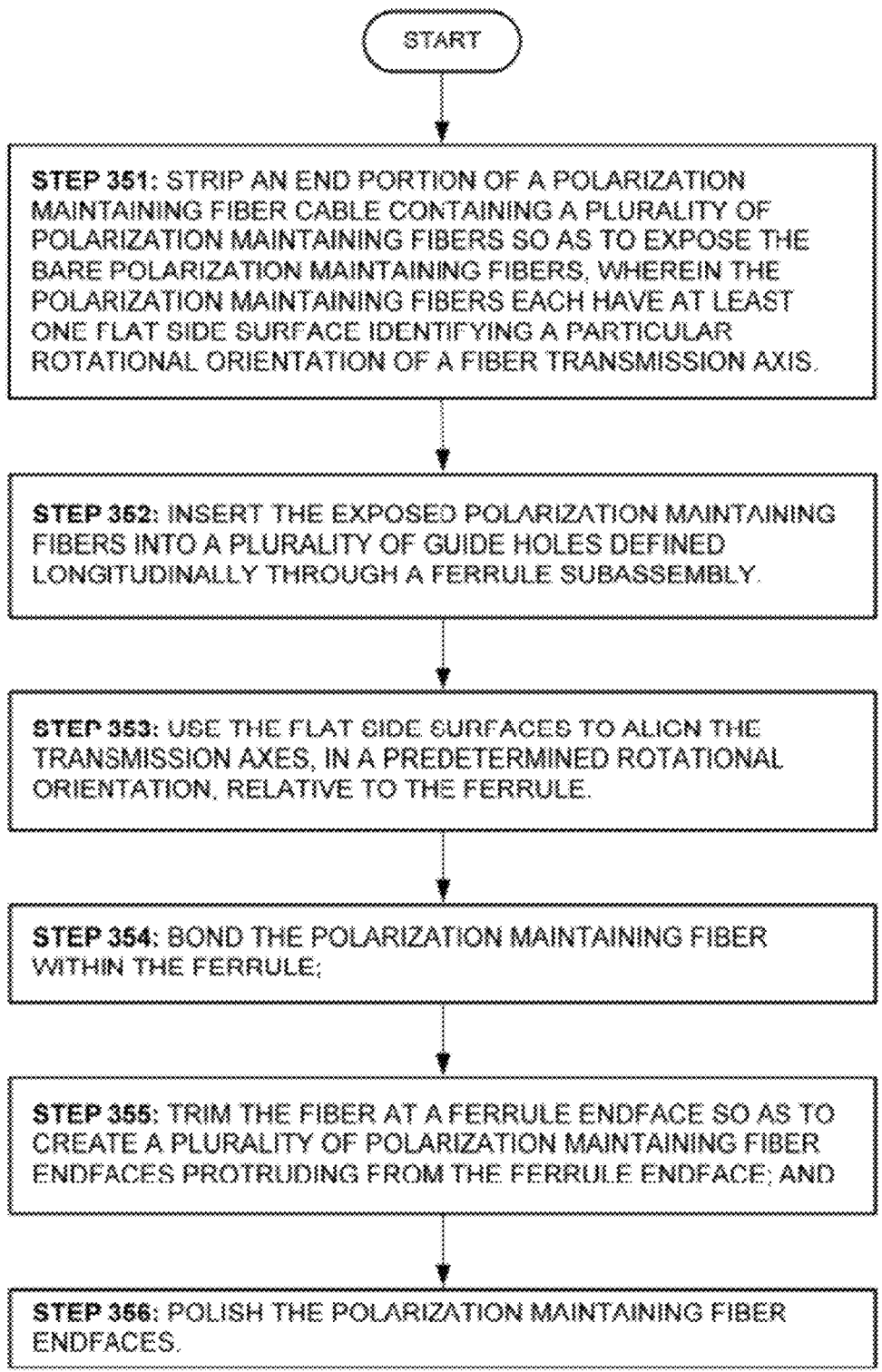
FIGS. 35 and 36 are flowcharts illustrating general techniques according to aspects of the invention.
Figure 36:
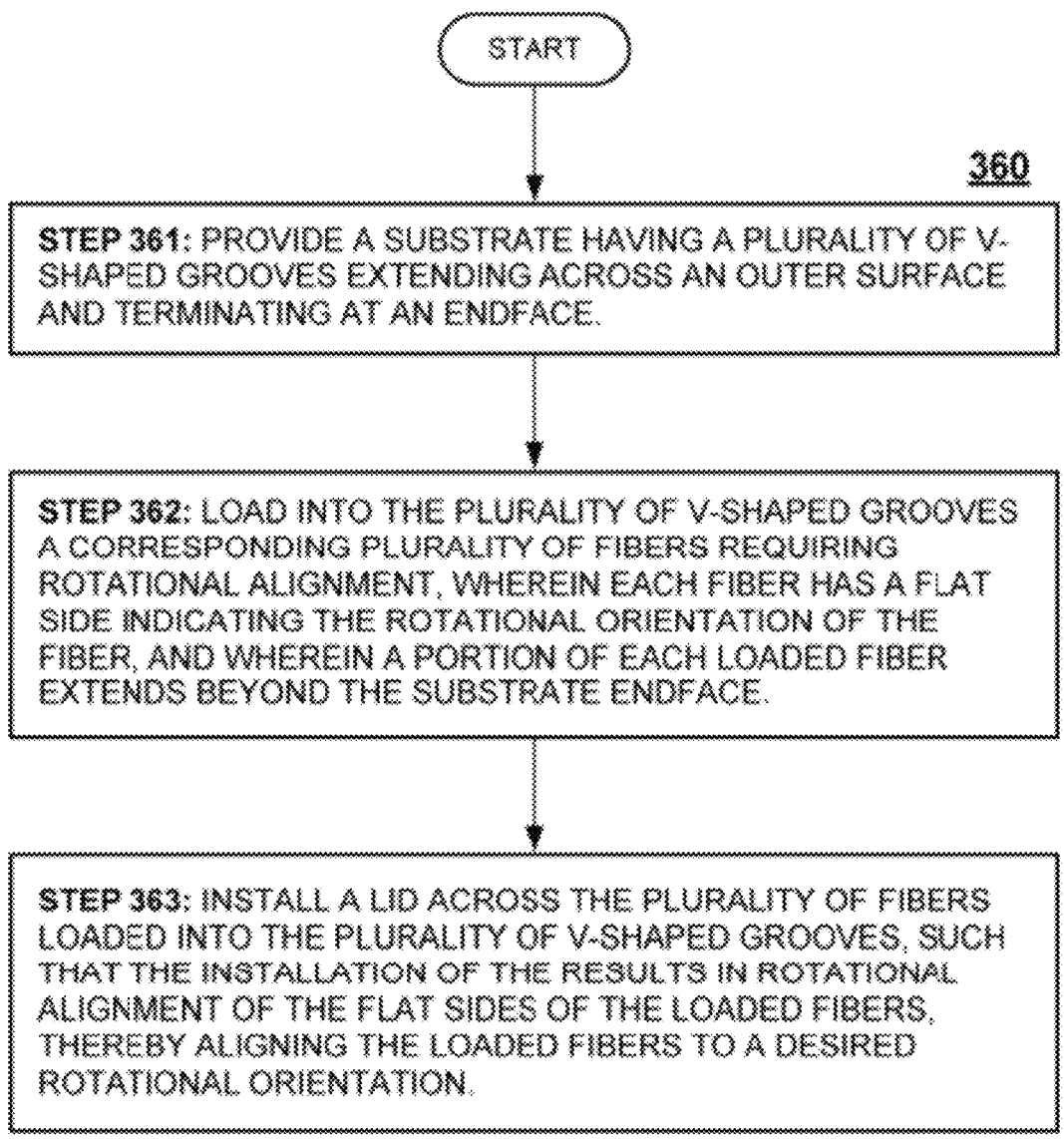

FIGS. 35 and 36 are flowcharts illustrating general techniques according to aspects of the invention. It should be noted that FIGS. 35 and 36 are intended to be exemplary, rather than limiting. The present invention may be practiced in a number of different ways, using different combinations of some or all of the elements set forth in these drawings, as well as combinations including elements not explicitly set forth in these drawings.

FIG. 35 is a flowchart illustrating a technique 350 according to the present invention for using an MT ferrule, or like device, in conjunction with a flat-sided PMF to provide aligned connectorization for the PMF.

Technique 350 includes the following steps:

Step 351: Strip an end portion of a polarization-maintaining fiber cable containing a plurality of polarization-maintaining fibers, so as to expose the bare polarization-maintaining fibers, wherein the polarization-maintaining fibers each have at least one flat side surface identifying a particular rotational orientation of a fiber transmission axis.

Step 352: Insert the exposed polarization-maintaining fibers into a plurality of guide holes defined longitudinally through a ferrule subassembly.

Step 353: Use the flat side surfaces to align the transmission axes, in a predetermined rotational orientation, relative to the ferrule.

Step 354: Bond the polarization-maintaining fiber within the ferrule.

Step 355: Trim the fiber at a ferrule endface so as to create a plurality of polarization-maintaining fiber endfaces protruding from the ferrule endface.

Step 356: Polish the polarization-maintaining fiber endfaces.

According to a further aspect of the invention, the plurality of guide holes includes one or more guide holes having a cross sectional profile including a flat side reference surface corresponding to the one or more flat side surfaces of the polarization-maintaining fibers. The polarization-maintaining fibers are alignable to a specified rotational orientation by installing them into the guide holes such that its flat surface abuts the corresponding flat reference surface in the guide hole.

According to a further aspect of the invention, the plurality of guide holes includes one or more guide holes having a cross sectional profile that are shaped such that a fiber threaded through the guide hole is rotatable around its longitudinal axis. The polarization-maintaining fibers are alignable to a specified rotational orientation by installing them into the guide holes and causing the flat surfaces of exposed fibers to abut a reference surface.

Using a ferrule of this type, in which the fibers are rotatable within their respective guide holes, the alignment feature can be implemented through the use of an alignment fixture into which the ferrule is seated as part of the assembly process. The exposed ends of the fiber are urged against a reference surface in the alignment fixture. Doing so causes an alignment of the fibers to a specified rotational orientation.

FIG. 36 is a flowchart illustrating a technique 360 according to the present invention for using a fiber block with an array of V-shaped grooves in conjunction with one or more flat-sided PMFs to provide aligned connectorization for the PMFs.

Technique 360 includes the following steps:

Step 361: Provide a substrate having a plurality of V-shaped grooves extending across an outer surface and terminating at an endface.

Step 362: Load into the plurality of V-shaped grooves a corresponding plurality of fibers requiring rotational alignment, wherein each fiber has a flat side indicating the rotational orientation of the fiber, and wherein a portion of each loaded fiber extends beyond the substrate endface.

Step 363: Install a lid across the plurality of fibers loaded into the plurality of V-shaped grooves, such that the installation of the lid results in rotational alignment of the flat sides of the loaded fibers, thereby aligning the loaded fibers to a desired rotational orientation.

B8. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A multifiber ferrule, comprising
a molded plastic body comprising block-shaped base and head sections, through which there extends one or more guide holes corresponding, respectively, to an equal number of respective polarization-maintaining fibers at an end of a multifiber optical fiber cable,
wherein each polarization-maintaining fiber has at least one flat side surface identifying a particular rotational orientation of a fiber transmission axis, such that the fiber transmission axis is alignable to a selected rotational orientation by causing the at least one flat side surface to abut a respective reference surface,
wherein each guide hole extends through the ferrule body and is shaped to closely receive a respective polarization-maintaining fiber threaded therethrough,
wherein each guide hole is provided with one or more flat side reference surfaces therewithin corresponding, respectively, to the one or more flat side surfaces of a respective polarization-maintaining fiber, such that alignment of the one or more flat side surfaces of each respective polarization-maintaining fiber against the one or more flat surfaces within each corresponding guide hole results in a rotational alignment of each polarization-maintaining fiber to a selected rotational orientation,
wherein each guide hole and respective polarization-maintaining fiber are configured to have a close enough fit such that each polarization-maintaining fiber is rotationally confined within its respective guide hole in the selected rotational orientation, and
wherein the ferrule body is configured to provide aligned connectorization with a mating structure for each of the respective endfaces of polarization-maintaining fibers installed into the guide holes.

2. The multifiber ferrule of claim 1,
wherein each guide hole and its respective polarization-maintaining fiber have corresponding D-shaped profiles,
wherein each polarization-maintaining fiber has a flat side surface extending along its length indicating the rotational orientation of a fiber polarization axis, and wherein each guide hole has a flat side reference surface extending along its length corresponding to the flat side surface of its respective polarization-maintaining fiber.

3. The multifiber ferrule of claim 2, wherein each polarization-maintaining fiber has a flat side surface extending along its length indicating the rotational orientation of the fiber's slow polarization axis.

4. The multifiber ferrule of claim 2, wherein each polarization-maintaining fiber has a flat side surface extending along its length indicating the rotational orientation of the fiber's fast polarization axis.

5. The multifiber ferrule of claim 2, wherein the guide holes are arranged in one or more linear arrays.

6. The multifiber ferrule of claim 5, wherein the flat reference surfaces of the guide holes in each of the one or more linear arrays are coplanar.

7. The multifiber ferrule of claim 1, wherein the ferrule is configured as a mechanical transfer ferrule.

\* \* \* \* \*